US010983323B2

(12) United States Patent
Dake

(10) Patent No.: US 10,983,323 B2
(45) Date of Patent: Apr. 20, 2021

(54) FLUORESCENCE OBSERVATION DEVICE

(71) Applicant: NIKON CORPORATION, Tokyo (JP)

(72) Inventor: Fumihiro Dake, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 90 days.

(21) Appl. No.: 16/394,857

(22) Filed: Apr. 25, 2019

(65) Prior Publication Data

US 2019/0250386 A1 Aug. 15, 2019

Related U.S. Application Data

(63) Continuation of application No. PCT/JP2017/039835, filed on Nov. 2, 2017.

(30) Foreign Application Priority Data

Nov. 2, 2016 (JP) .............................. JP2016-215694

(51) Int. Cl.
*G02B 21/00* (2006.01)
*G02B 21/16* (2006.01)
(Continued)

(52) U.S. Cl.
CPC ....... *G02B 21/0032* (2013.01); *G01N 21/636* (2013.01); *G01N 21/6458* (2013.01); *G02B 21/0048* (2013.01); *G02B 21/06* (2013.01); *G02B 21/16* (2013.01); *G02B 26/10* (2013.01); *G01N 2201/105* (2013.01)

(58) Field of Classification Search
CPC ............. G02B 21/0032; G01N 21/636; G01N 21/6458
See application file for complete search history.

(56) References Cited

U.S. PATENT DOCUMENTS

2008/0019637 A1 1/2008 Little et al.
2010/0054753 A1 3/2010 Futami et al.
(Continued)

FOREIGN PATENT DOCUMENTS

JP   2010-60656    3/2010
JP   2014-97191    5/2014
(Continued)

OTHER PUBLICATIONS

Japanese Office Action dated Nov. 12, 2019 in corresponding Japanese Patent Application No. 2018-549087.
(Continued)

*Primary Examiner* — Hugh Maupin

(57) ABSTRACT

A fluorescence observation device includes: a first intensity-modulating unit that intensity-modulates, at a frequency f1, pump light that excites fluorescence of an observed subject; a second intensity-modulating unit that intensity-modulates, at a frequency f2 different from the frequency f1, probe light that induces stimulated emission of the observed subject; a light-receiving unit that receives the fluorescence from the observed subject irradiated with the intensity-modulated pump light and probe light; and a sensing unit that senses a component with a frequency of i×f1±j×f2 (i and j are positive integers, at least one of which is equal to or larger than two) in a reception-light signal sensed at the light-receiving unit.

13 Claims, 28 Drawing Sheets

(51) Int. Cl.
　　　*G01N 21/64*　　(2006.01)
　　　*G02B 21/06*　　(2006.01)
　　　*G01N 21/63*　　(2006.01)
　　　*G02B 26/10*　　(2006.01)

(56) References Cited

U.S. PATENT DOCUMENTS

2012/0307238 A1　12/2012　Fujita et al.
2016/0103307 A1*　4/2016　Frankel .............. G02B 21/0028
　　　　　　　　　　　　　　　　　　　　　　　　600/317

FOREIGN PATENT DOCUMENTS

JP　　　　2014-157372　　8/2014
WO　　WO 2011/099269 A1　8/2011

OTHER PUBLICATIONS

Wei, Lu et al., "Stimulated emission reduced fluorescence microscopy: a concept for extending the fundamental depth limit of two-photon fluorescence imaging", Biomedical Optics Express, vol. 3, No. 6, Jun. 2012.
International Search Report dated Feb. 6, 2018 in corresponding International Application No. PCT/JP2017/039835.
Written Opinion of the International Searching Authority dated Feb. 6, 2018 in corresponding International Application No. PCT/JP2017/039835.
English Translation by WIPO of the International Preliminary Report on Patentability dated May 7, 2019 in corresponding International Patent Application No. PCT/JP2017/039835 (7 pages).

* cited by examiner

FLUORESCENCE OBSERVATION DEVICE

CROSS-REFERENCE TO RELATED APPLICATIONS

This application is a continuation of International Application No. PCT/JP2017/039835, filed on Nov. 2, 2017, which claims the foreign priority benefit to Japanese Patent Application No. 2016-215694, filed on Nov. 2, 2016, the disclosures of which are incorporated herein by reference.

BACKGROUND

1. Technical Field

The present invention relates to a fluorescence observation device.

2. Related Art

Microscopes that construct an image by exciting a fluorescent substance with two photons, irradiating the fluorescent substance with a laser beam that induces stimulated emission, and acquiring reduced fluorescence have been known (see Non-Patent Literature 1, for example).
[Non-Patent Literature 1] Lu Wei et. al., Biomedical Optics Express 1465-1475, vol. 3, No. 6, 1 Jun. 2012

SUMMARY

According to a first aspect of the present invention, a fluorescence observation device includes a first intensity-modulating unit that intensity-modulates, at a frequency f1, pump light that excites fluorescence of an observed subject; a second intensity-modulating unit that intensity-modulates, at a frequency f2 different from the frequency f1, probe light that induces stimulated emission of the observed subject; a light-receiving unit that receives the fluorescence from the observed subject irradiated with the intensity-modulated pump light and probe light; and a sensing unit that senses a component with a frequency of $i \times f1 \pm j \times f2$ (i and j are positive integers, at least one of which is equal to or larger than two) in a reception-light signal sensed at the light-receiving unit.

According to a second aspect of the present invention, a fluorescence observation device includes: a first intensity-modulating unit that intensity-modulates, at a frequency f1, pump light that excites fluorescence of an observed subject; a second intensity-modulating unit that intensity-modulates, at a frequency f2 different from the frequency f1, first probe light that induces stimulated emission of the observed subject; a third intensity-modulating unit that intensity-modulates, at a frequency f3 different from the frequencies f1 and f2, second probe light that induces stimulated emission of the observed subject, and has a wavelength different from the first probe light; a first light-receiving unit that receives fluorescence from the observed subject irradiated with the intensity-modulated pump light, first probe light, and second probe light, the fluorescence corresponding to the pump light and the first probe light; a first sensing unit that senses a component with a frequency of $i \times f1 \pm j \times f2$ (i and j are positive integers, at least one of which is equal to or larger than two) in a reception-light signal sensed at the first light-receiving unit; a second light-receiving unit that receives fluorescence from the observed subject irradiated with the intensity-modulated pump light, first probe light, and second probe light, the fluorescence corresponding to the pump light and the second probe light; and a second sensing unit that senses a component with a frequency of $p \times f1 \pm q \times f3$ (p and q are positive integers, at least one of which is equal to or larger than two) in a reception-light signal sensed at the second light-receiving unit.

According to a third aspect of the present invention, a fluorescence observation method includes: intensity-modulating, at a frequency f1, pump light that excites fluorescence of an observed subject; intensity-modulating, at a frequency f2 different from the frequency f1, probe light that induces stimulated emission of the observed subject; receiving, at a light-receiving unit, the fluorescence from the observed subject irradiated with the intensity-modulated pump light and probe light; and sensing a component with a frequency of $i \times f1 \pm j \times f2$ (i and j are positive integers, at least one of which is equal to or larger than two) in a reception-light signal sensed at the light-receiving unit.

According to a fourth aspect of the present invention, a fluorescence observation method includes: intensity-modulating, at a frequency f1, pump light that excites fluorescence of an observed subject; intensity-modulating, at a frequency f2 different from the frequency f1, first probe light that induces stimulated emission of the observed subject; intensity-modulating, at a frequency f3 different from the frequencies f1 and f2, second probe light that induces stimulated emission of the observed subject, and has a wavelength different from the first probe light; receiving, at a first light-receiving unit, fluorescence from the observed subject irradiated with the intensity-modulated pump light, first probe light, and second probe light, the fluorescence corresponding to the pump light and the first probe light; sensing a component with a frequency of $i \times f1 \pm j \times f2$ (i and j are positive integers, at least one of which is equal to or larger than two) in a reception-light signal sensed at the first light-receiving unit; receiving, at a second light-receiving unit, fluorescence from the observed subject irradiated with the intensity-modulated pump light, first probe light, and second probe light, the fluorescence corresponding to the pump light and the second probe light; and sensing a component with a frequency of $p \times f1 \pm q \times f3$ (p and q are positive integers, at least one of which is equal to or larger than two) in a reception-light signal sensed at the second light-receiving unit.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
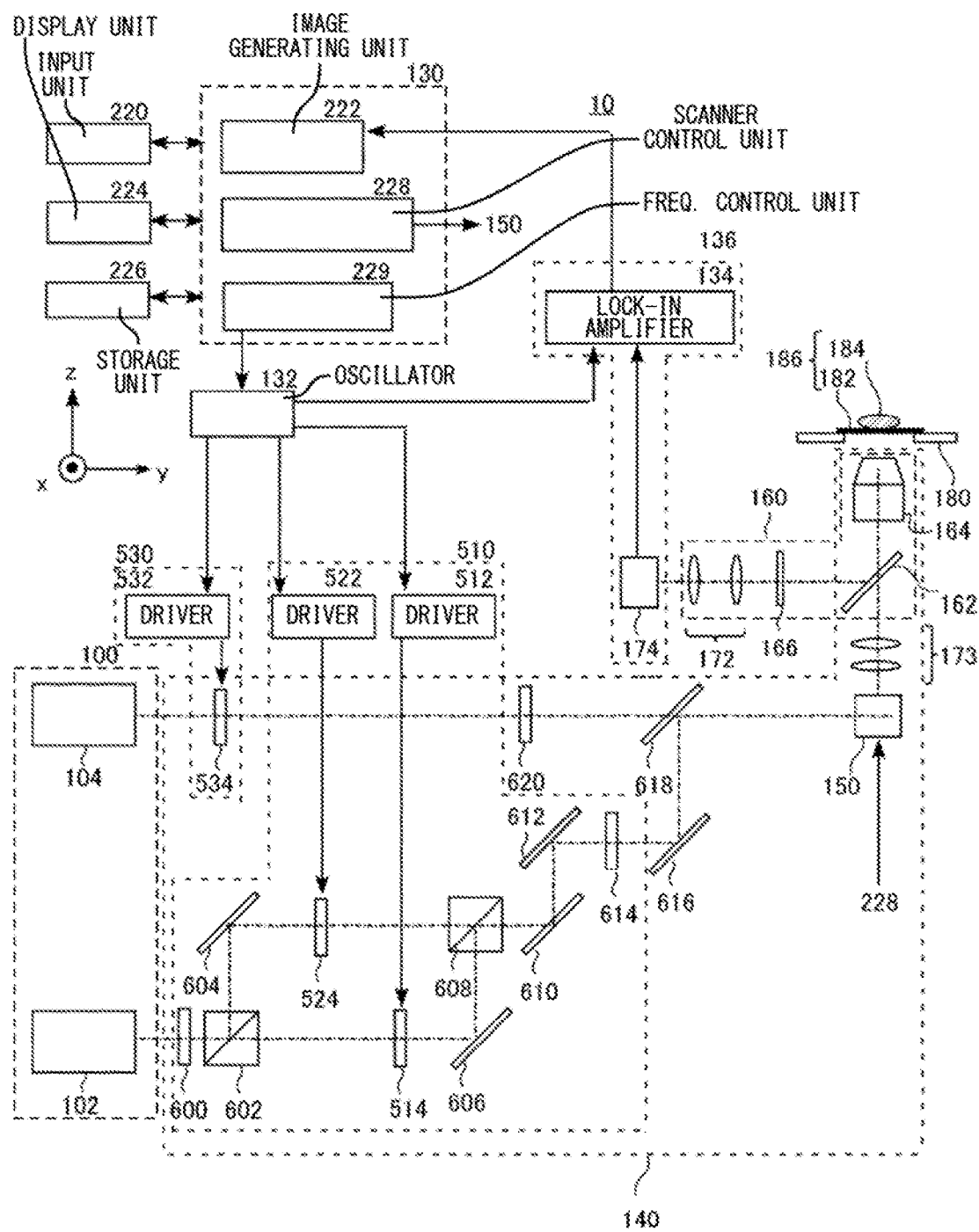
FIG. 1 is a figure illustrating the configuration of a microscope device 10 according to the present embodiment.

FIG. 1 is a figure illustrating the configuration of a microscope device 10 as an exemplary fluorescence observation device according to the present embodiment. The microscope device 10 irradiates an observed subject with pump light, and probe light to thereby make a fluorescent substance of the observed subject generate a signal of fluorescence (hereinafter, referred to as reduced fluorescence, a reduced fluorescence signal, etc.) produced by the fluorescent substance, and reduced due to stimulated emission. The reduced fluorescence signal can be sensed by intensity-modulating the pump light and the probe light. Specific methods therefor include lock-in sensing or the like. Similarly, a reduced fluorescence signal having undergone stimulated absorption and stimulated emission induced by pump light multiple times can also be sensed by lock-in sensing. Since reduced fluorescence signals obtained by lock-in sensing are obtained as a result of multiple products of the pump light, and the probe light, the signal generation region is restricted. Particularly, a reduced fluorescence signal having undergone stimulated absorption and stimulated emission induced by pump light multiple times has a more restricted signal generation region than that of a reduced fluorescence signal having undergone stimulated absorption and stimulated emission once. Thereby, spatial resolution can be enhanced. Note that hereinafter, reduced fluorescence is collectively referred to as fluorescence in some cases. In addition, hereinafter, a microscope that acquires reduced fluorescence is referred to as a reduced fluorescence microscope. x, y, and z axes are illustrated in FIG. 1 for explanation.

The microscope device 10 includes: a light source 100 that outputs pump light, and probe light; an illuminating optical system 140 that illuminates an observed subject 184 with pump light, and probe light; an observation optical system 160 for observing light emitted from the observed subject 184; and a sensing unit 136 that senses light through the observation optical system 160. The microscope device 10 further includes a stage 180 that supports an observed subject 184. The microscope device 10 further includes: a control unit 130 that performs overall control of the microscope device 10; and an input unit 220, a display unit 224, and a storage unit 226 that transmit and receive signals to and from the control unit 130.

The observed subject 184, and a slide glass 182 on which the observed subject 184 is placed form a specimen 186. The observed subject 184 is biological cells, for example. The observed subject 184 contains a fluorescent substance.

The light source 100 has a laser light source 102 for pump light, and a laser light source 104 for probe light. A dichroic mirror that combines pump light and probe light may also be provided. The laser light sources 102, 104 are both continuous wave laser light sources, for example, and moreover output laser light with wavelengths that are different from each other. Pump light excites a fluorescent substance, and makes the fluorescent substance generate fluorescence. Probe light induces stimulated emission from a fluorescent substance to thereby reduce fluorescence. The wavelength of the pump light is shorter than the wavelength of the probe light. For example, the wavelength of the pump light is 532 nm, and the wavelength of the probe light is 640 nm. These wavelengths of the pump light and probe light are set as appropriate according to the absorption band (absorption spectrum) and fluorescence band (fluorescence spectrum) of a fluorescent substance. These wavelengths of the pump light, and probe light may be set automatically, or may be input by a user through the input unit 220.

The illuminating optical system 140 has, for pump light: a half-wave plate 600; a polarization beam splitter 602; mirrors 604, 606, 610, 612, 616; acousto-optic frequency shifters (hereinafter, also referred to as AOFSs) 514, 524; and a polarizing plate 614. The illuminating optical system 140 further has, for probe light: an acousto-optical modulator 534 (hereinafter, also referred to as an AOM), and a half-wave plate 620. Furthermore, the illuminating optical system 140 has a dichroic mirror 618, a scanning unit 150, a lens pair 173, a dichroic mirror 162, and an object lens 164. The observation optical system 160 has the object lens 164, the dichroic mirror 162, an optical filter 166, and a lens pair 172.

The half-wave plate 600 rotates, by 45 degrees from the x axis on the xz plane, pump light which exited from the laser light source 102, and is linearly polarized light having an electric field that vibrates in the x direction. The polarization beam splitter 602 splits, in two orthogonal polarization directions, the pump light which is linearly polarized light having an electric field that vibrates in a direction tilted by 45 degrees from the x axis on the xz plane. For example, the polarization beam splitter 602 reflects linearly polarized light having an electric field that vibrates in the x direction, and transparently transmits therethrough linearly polarized light having an electric field that vibrates in the z direction.

The AOFS 514 functions as a diffraction grating for light. At an acoustic frequency determined based on an electrical signal from an oscillator 132, a driver 512 drives the AOFS 514, and shifts the frequency of positive first-order diffracted light by the acoustic wave frequency. The positive first-order diffracted light produced by the AOFS 514 is reflected off the mirror 606, and guided to a polarization beam splitter 608. Similarly, the AOFS 524 function as a diffraction grating for light, and positive first-order diffracted light produced by the AOFS 524 is guided to the polarization beam splitter 608. The optical intensity of pump light immediately after passing through each AOFS is not modulated yet, but is constant for a length of time.

A difference f1 of several MHz is provided between the acoustic wave frequencies of the two AOFSs 514, 524. For example, by controlling DC voltages to be applied to the drivers 512, 522 from the oscillator 132, the acoustic wave frequency of the AOFS 514 is set to f0 MHz, and the acoustic wave frequency of the AOFS 524 is set to f0+f1 MHz. The frequencies of positive first-order diffracted light produced from both the AOFSs 514, 534 are shifted by the acoustic wave frequencies. For example, if the wavelength of pump light is 532 nm, its light frequency is equivalent to 564 THz. In this case, the frequency of light diffracted at the AOFS 514 is 564+(f0×10−6) THz, and the frequency of light diffracted at the AOFS 524 is 564+((f0+f1)×10−6) THz.

The diffracted lights are combined coaxially by the polarization beam splitter 608. Note that, because of this, the polarization beam splitter 608 can be said to function as a polarization beam combiner.

Although the combined pump lights preserve their polarization directions, mutually parallel polarization components, for example polarization components having electric fields that vibrate in a direction tilted by 45 degrees from the x axis on the xz plane are transparently transmitted through the polarizing plate 614. Thereby, the pump lights interfere with each other, and the optical intensities are modulated at the above-mentioned difference f1 between the acoustic wave frequencies. Note that these AOFSs 514, 524, drivers 512, 522, half-wave plate 600, polarization beam splitters 602, 608, mirrors 604, 606, 610, 612, and polarizing plate 614 constitute a first intensity-modulating unit 510.

On the other hand, by controlling a voltage of a driver 532 that drives the AOM 534 which probe light enters, generation of first-order diffracted light of probe light is controlled. It is possible to maintain the state where first-order diffracted light is produced always (the ON-state, that is, the state where the intensity is the maximum), it is possible to maintain the state where first-order diffracted light is not produced always (the OFF-state, that is, the state where the intensity is the minimum), and it is possible to modulate the optical intensity. For example, if a constant voltage value is given from the driver 532, the optical intensity has a constant value corresponding to the voltage value. For example, if a voltage value given from the driver 532 is zero for a length of time, the optical intensity also becomes zero. For example if the voltage waveform of the driver 532 is a sine wave, the intensity of light is modulated corresponding to the sine wave. In the present embodiment, probe light is intensity-modulated at a frequency f2 of several tens MHz, for example, by the AOM 534 based on oscillation from the oscillator 132. An advantage of the AOM 534 is that it can perform intensity-modulation at a relatively high frequency of several tens MHz. Note that these AOM 534, and driver 532 constitute a second intensity-modulating unit 530.

The dichroic mirror 618 combines the respectively intensity-modulated pump light, and probe light coaxially, and guides them to the scanning unit 150.

The scanning unit 150 is disposed at a position which is almost conjugate with the pupil plane of the object lens 164. Because of this, the lens pair 173 is desirably placed between the scanning unit 150 and the dichroic mirror 162. An example of the scanning unit 150 is a galvano scanner which has a pair of galvano mirrors that can be rotated in mutually orthogonal directions. The angles of those galvano mirrors are changed to scan a spot position of laser light in the observed subject 184 in the x and y directions. Another example of the scanning unit 150 is a resonant scanner (resonant scanner). The resonant scanner has a resonant mirror (resonant mirror) that operates resonantly. The resonant scanner includes a resonant mirror for main scanning, and a galvano mirror for sub-scanning, for example. Using a resonant scanner enables faster scanning.

Laser light output from the scanning unit 150 is transparently transmitted through the dichroic mirror 162, and is guided to the object lens 164. The object lens 164 concentrates the laser light onto the observed subject 184.

Fluorescence produced from a fluorescent substance of the observed subject 184 passes through the object lens 164, and is reflected off the dichroic mirror 162, and the pump light, and probe light are removed from the fluorescence by the optical filter 166. Due to the lens pair 172, the fluorescence enters a light-receiving unit 174 placed at a position which is almost conjugate with the object lens pupil plane. Note that the dichroic mirror 162 may be placed between the lens pair 173 and the scanning unit 150, or may be placed on the light source side of the scanning unit 150.

The sensing unit 136 includes the light-receiving unit 174, and a lock-in amplifier 134. The light-receiving unit 174 is disposed at a position which is almost conjugate with the pupil plane of the object lens 164. An example of the light-receiving unit 174 is a photomultiplier. The light-receiving unit 174 performs photoelectric conversion to output an electrical signal corresponding to the intensity of the received fluorescence. Output of the light-receiving unit 174 is input to the lock-in amplifier 134, and sensed by lock-in sensing. The lock-in sensing is described later.

The input unit 220, display unit 224, storage unit 226, and control unit 130 may be a PC or the like, for example. The input unit 220 is where input from a user to the control unit 130 is accepted, and for example is a keyboard, a touch panel, a mouse, or the like. The display unit 224 is a display that displays GUIs, sensing results, and observation images, for example. The storage unit 226 stores programs, parameters, or the like for controlling the microscope device 10, and sensing results, observation images, or the like.

The control unit 130 has a frequency control unit 229, a scanner control unit 228, and an image generating unit 222. According to input from a user, or automatically based on a fluorescent substance, the frequency control unit 229 controls an oscillation frequency generated at the oscillator 132. The scanner control unit 228 controls the scanning unit 150. The image generating unit 222 generates an image based on a result of sensing by the sensing unit 136, and displays the image on the display unit 224.

Figure 2:
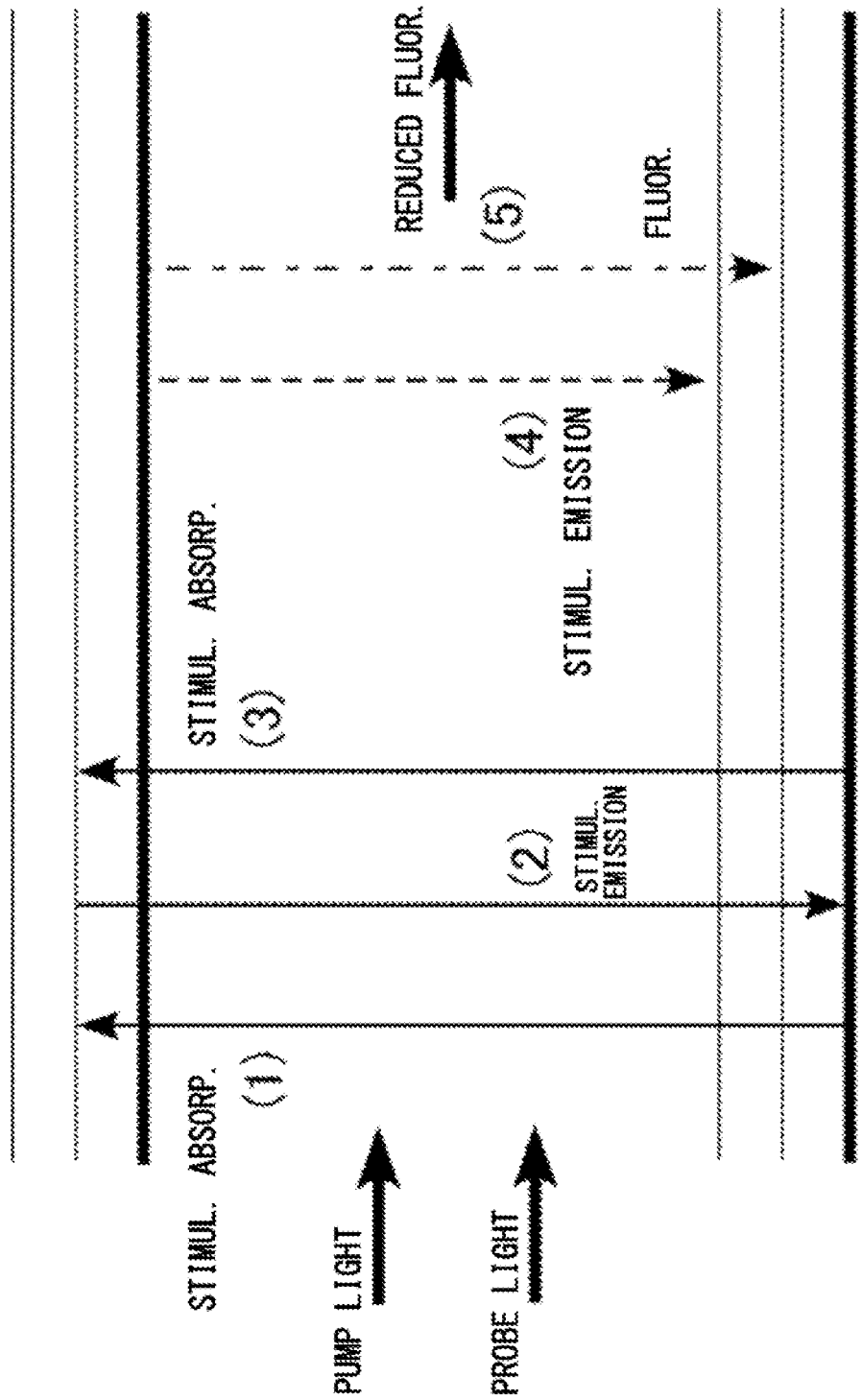
FIG. 2 is a state transition diagram.
Figure 4:
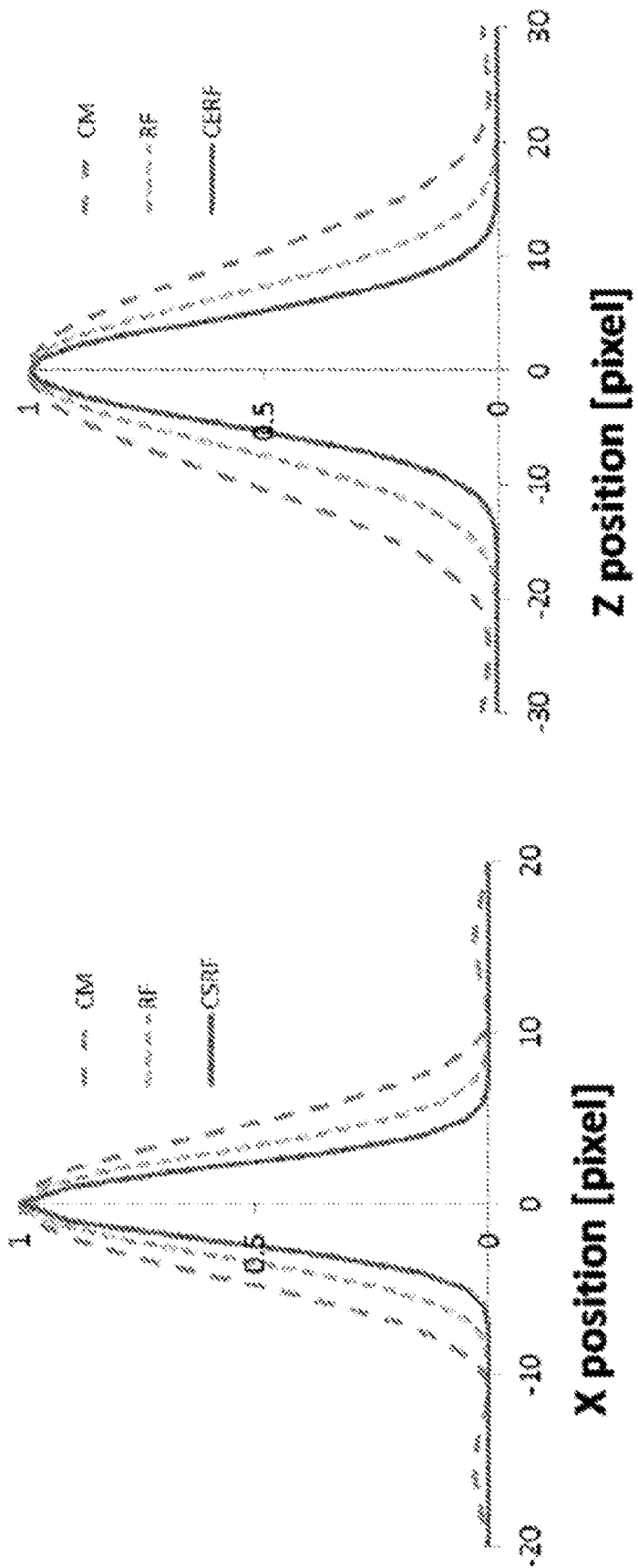
FIG. 4 illustrates a signal generation region simulation result.

Principles of observation based on reduced fluorescence using the microscope device 10 are explained with reference to FIG. 2 and FIG. 4. FIG. 2 is a state transition diagram. FIG. 4 illustrates a signal generation region simulation result.

A fluorescent substance is irradiated with pump light that excites the fluorescent substance, and probe light that induces stimulated emission. The pump light and probe light are intensity-modulated at frequencies f1, f2 for a length of time, IPump, and IProbe are defined as their time waveforms, and then:

[Formula 1]

$$I_{Pump}(t)=I_1[1+m\cos(f_1 t)] \quad (1.1)$$

$$I_{Probe}(t)=I_2[1+n\cos(f_2 t)] \quad (1.2)$$

Here, I1 and I2 are the intensities of the pump light and probe light, and m and n are the contrasts of modulation.

At this time, in an interaction between the light and the substance, the following processes:
(step 1) Stimulated absorption induced by pump light (1);
(step 2) Stimulated emission induced by pump light (2);
(step 3) Second stimulated absorption induced by pump light (3); and
(step 4) Stimulated emission induced by probe light (4);
occur in a time sequence at a certain probability as illustrated in FIG. 2 (in FIG. 2, the solid lines indicate stimulated absorption and emission induced by pump light, and the broken line indicates stimulated emission induced by probe light). Reduced fluorescence signals produced as a result of this are defined as CERF (Cyclic Excitation Reduced Fluorescence) signals (5) (the alternate long and short dash line in FIG. 2 indicates fluorescence), and then:

[Formula 2]

$$\begin{aligned}I_{CERF}(t) &\propto I_{Pump}^3 I_{Probe} = I_1^3 I_2[1+m\cos f_1 t]^3[1+n\cos f_2 t] = \quad (1.3)\\
&I_1^3 I_2[1+3m\cos f_1 t+3m^2\cos^2 f_1 t+m^3\cos^3 f_1 t][1+n\cos f_2 t]=\\
&I_1^3 I_2\left[1+\frac{3}{2}m^2+\left(3m+\frac{3}{4}m^3\right)\cos f_1 t+\frac{3}{2}m^2\cos 2f_1 t+\right.\\
&\left.\frac{3}{4}m^3\cos 3f_1 t+n\left(1+\frac{3}{2}m^2\right)\cos f_2 t\right]+\\
&\frac{1}{2}I_1^3 I_2 mn\left(3+\frac{3}{4}m^2\right)[\cos(f_1-f_2)t+\cos(f_1+f_2)t]+\\
&\frac{3}{4}I_1^3 I_2 m^2 n[\cos(2f_1-f_2)t+\cos(2f_1+f_2)t]+\\
&\frac{3}{8}I_1^3 I_2 m^2 n[\cos(3f_1-f_2)t+\cos(3f_1+f_2)t]\end{aligned}$$

In the fluorescent sample, such an interaction between the light and the substance is constantly repeated.

On the other hand, typical reduced fluorescence signals are:

[Formula 3]

$$\begin{aligned}I_{RF}(t) &\propto I_{Pump}I_{Probe}= \quad (1.4)\\
&I_1 I_2[1+m\cos(f_1 t)][1+n\cos(f_2 t)]=I_1 I_2\left[1+\frac{mn}{2}+m\cos f_1 t+\right.\\
&\left. n\cos f_2 t+\frac{mn}{2}\cos[(f_1-f_2)t]+\frac{mn}{2}\cos[(f_1+f_2)t]\right]\end{aligned}$$

Accordingly, by demodulation at the lock-in amplifier 134 using the demodulation frequency of 2f1+f2 or 2f1−f2, or 3f1+f2 or 3f1−f2, typical reduced fluorescence signals can be removed, and only CERF signals can be sensed. The demodulation frequency may be any of the sum of and the difference between two or more frequencies that are used for intensity-modulation. This is simply represented by "±". An advantage of sensing these signals is that, since the sensing signals are obtained as a result of multiple products of pump light, and probe light, the signal generation region is restricted. This mechanism is described later. In addition, since each of the signals is proportional to each of the third power of I1, and the first power of I2, the signal quantity is significantly increased by raising the pump light intensity I1, and an advantageous signal-to-noise ratio can also be attained.

Specifically, the above-mentioned demodulation frequency is input from the oscillator 132 to the lock-in amplifier 134. The lock-in amplifier 134 extracts a signal that is synchronized with the demodulation frequency. While the scanning unit 150 is scanning light spot positions in the observed subject 184, the lock-in amplifier 134 performs lock-in sensing pixel by pixel, and stores results of the lock-in sensing in the storage unit 226, associating a result about each pixel with positional information about the pixel. The image generating unit 222 reads out the sensing results associated with the positional information from the storage unit 226, generates a reduced fluorescence observation image, and displays the image on the display unit 224.

Figure 3:
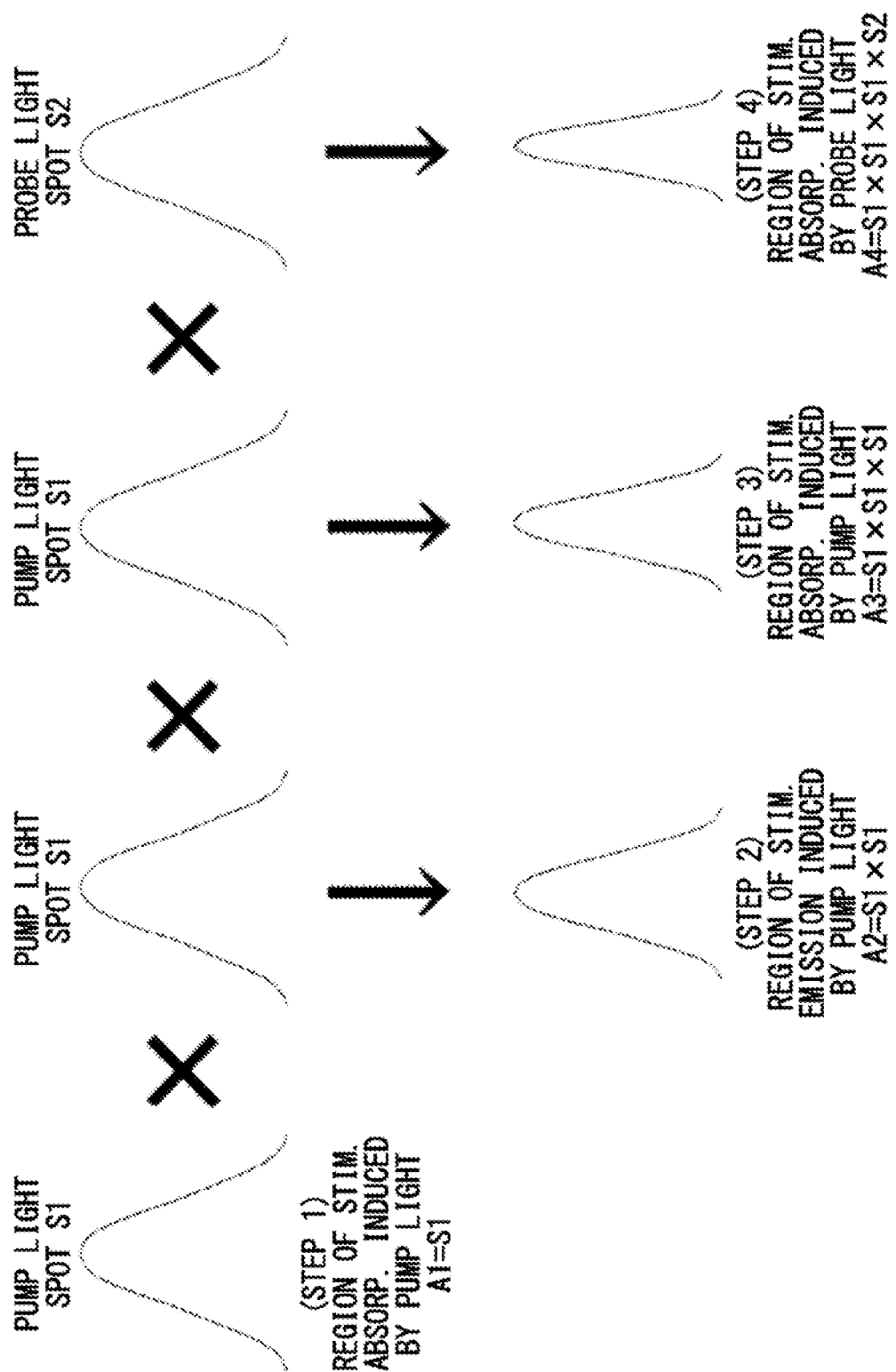
FIG. 3 is a figure for explaining principles of resolution enhancement.

FIG. 3 is a figure for explaining principles of resolution enhancement. S1, and S2 are defined as the intensity distributions of light spots of pump light, and probe light, respectively. For each spot in the figure, the vertical axis corresponds to intensities, and the horizontal axis corresponds to spatial coordinates.

Step 1

If A1 is defined as the generation distribution indicating generation of stimulated absorption induced by pump light, since the generation distribution is equal to the intensity distribution of pump light:

[Formula 4]

$$A_1=S_1 \quad (1.5)$$

Step 2

A2 is defined as the generation distribution indicating generation of stimulated emission induced by pump light. Since this signal generation region is equal to the product of the generation distribution of stimulated absorption induced by pump light at Step 1, and the generation distribution of stimulated emission induced by pump light:

[Formula 5]

$$A_2=S_1^2 \quad (1.6)$$

Step 3

A3 is defined as the generation distribution indicating further generation of stimulated absorption induced by pump light after Step 2. Since this signal generation distribution is equal to the product of the generation distribution of stimulated absorption induced by pump light at Step 1, the generation distribution of stimulated emission induced by pump light at Step 2, and the generation distribution of stimulated absorption induced by pump light:

[Formula 6]

$$A_3=S_1^3 \quad (1.7)$$

Step 4

A4 is defined as the generation distribution indicating generation of stimulated emission induced by probe light after Step 3. Since this signal generation distribution is equal to the product of the generation distribution of stimulated absorption induced by pump light at Step 1, the generation distribution of stimulated emission induced by pump light at Step 2, the generation distribution of stimulated absorption induced by pump light at Step 3, and the generation distribution of stimulated emission induced by probe light:

[Formula 7]

$$A_4 = S_1^3 S_2 \qquad (1.8)$$

This generation distribution A4 is equivalent to the generation distribution of CERF signals visualized by lock-in sensing. In this manner, by sensing reduced fluorescence signals produced through stimulated absorption and stimulated emission induced by pump light multiple times, it is possible to emphasize contribution of fluorescence generation from the center of a light spot, and to de-emphasize contribution of fluorescence generation from the perimeter of the light spot as illustrated in FIG. 3; therefore, the region of signal generation from the observed subject 184 can be restricted to the diffraction limitation or lower; as a result, the resolution can be enhanced.

FIG. 4 illustrates a signal generation region simulation result. For comparison, signal generation regions of a typical confocal microscope (CM), and a reduced fluorescence (RF) microscope are illustrated. It can be known that, due to the effect attained by producing signals in the distribution as represented by the multiple products of pump light and probe light, the signal generation region of CERF becomes sharp in both the X direction, and Z direction.

Note that although it is assumed here that reduced fluorescence signals produced by (Step 4) stimulated emission induced by probe light after (step 1) stimulated absorption induced by pump light, (step 2) stimulated emission induced by pump light, and (step 3) stimulated absorption induced by pump light are sensed, reduced fluorescence signals produced by stimulated emission induced by probe light after further stimulated emission induced by pump light, and stimulated absorption induced by pump light after step 3 may be sensed. In this case, the demodulation frequencies are desirably 4f1±f2, and 5f1±f2. Since each of the signals is proportional to each of the fifth power of I1, and the first power of I2, the signal quantity is significantly increased by raising the pump light intensity I1, and the signal-to-noise ratio can also be enhanced. If the above-mentioned matters are represented in a generalized form, lock-in sensing is performed using a demodulation frequency of i×f1±f2 (i is a positive integer which is equal to or larger than two), and this makes it possible to sense reduced fluorescence signals with higher spatial resolution.

Figure 5A:
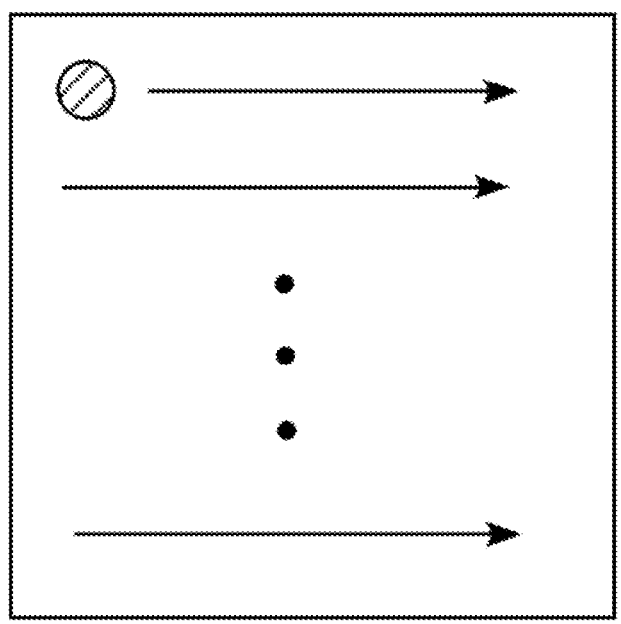
FIG. 5A is a conceptual diagram for explaining the scan speed and sensing speed.
Figure 5A:
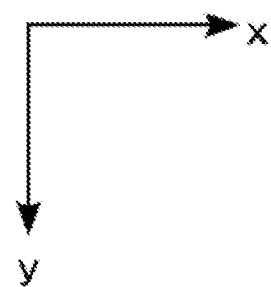
Figure 5B:
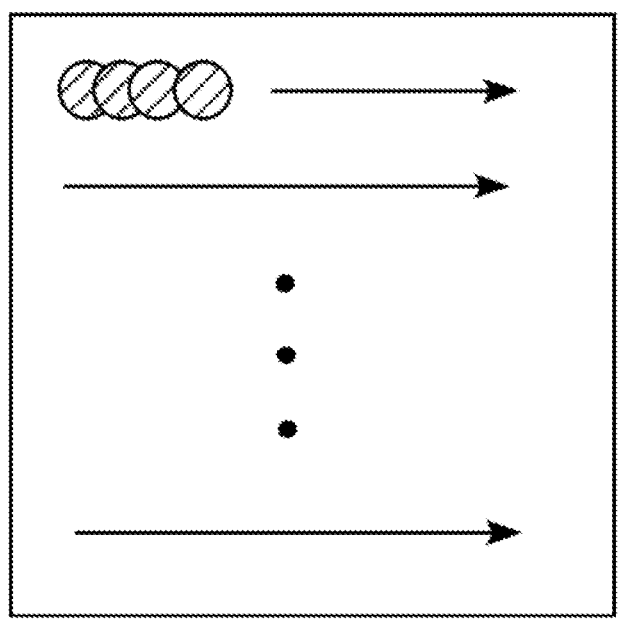
FIG. 5B is a conceptual diagram for explaining the scan speed and sensing speed.
Figure 5B:
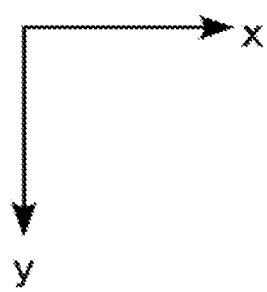

FIG. 5A and FIG. 5B are conceptual diagrams for explaining the scan speeds and sensing speeds of the scanning unit 150. Since the length of time required for scanning in a main scanning (the x direction in the figure) of a galvano scanner is longer than that of a resonant scanner, it may be considered that the position of a beam will not change almost at all in the length of time required for sensing by demodulation using a difference frequency as illustrated in FIG. 5A. However, since the length of time required for scanning in a main scanning (the x direction in the figure) of a resonant scanner is shorter than that of the galvano scanner, the position of a beam changes as illustrated in FIG. 5B in the length of time required for sensing by demodulation using a difference frequency, and there is a fear that it becomes difficult to acquire accurate images. However, if demodulation is performed using a sum frequency, since the frequency for demodulation is high, the length of time required for sensing also becomes short, and it may be considered that the position of a beam does not change almost at all in a predetermined length of time required for signal sensing at a predetermined position even if the resonant scanner is used. Accordingly, accurate images can be acquired while at the same time high speed sensing is performed using the resonant scanner.

A reason for using the two AOFSs 514, 524 in the microscope device 10 is that higher harmonics due to modulation distortion can be suppressed thereby. In the proposed technique, signals having undergone repetitive stimulated absorption/stimulated emission produced by pump light are sensed. Since these signals are produced at integer multiples of the basic modulation frequency f1 for a length of time, the original modulation is desirably performed in a sine wave form with only the basic frequency f1. There is generally a drawback that modulation with the use of only AOMs results in slight mixing of frequency components of integer multiples of f1. In contrast, the use of AOFSs can suppress the influence significantly. That is, as compared with direct modulation with the use of AOMs, modulation distortion components can be reduced significantly, and so a more preferable configuration can be realized.

In addition, it is desirable to make the intensities of first-order diffracted lights diffracted from the two AOFSs 514, 524 equal in order to maximize modulation contrast. Because of this, it is desirable to set the intensities of lights that enter the AOFSs 514, 524 equal using the half-wave plate 600 immediately after pump light laser emission. Furthermore, it is desirable to correct the optical intensity difference produced due to individual differences between AOFSs by fine adjustment of the angle of the polarizing plate 614 to thereby maximize interference contrast.

Figure 6:
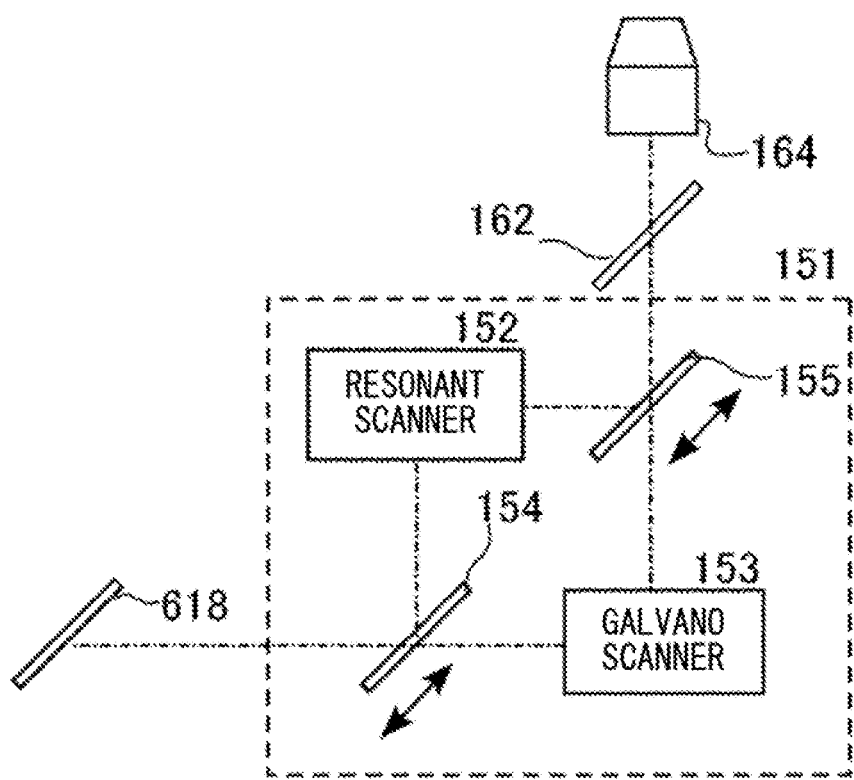
FIG. 6 illustrates another exemplary scanning unit 151.

FIG. 6 illustrates another exemplary scanning unit 151. The scanning unit 151 has a resonant scanner 152, a galvano scanner 153, and a pair of mirrors 154, 155. The pair of mirrors 154, 155 are individually movable in the directions of arrows in the figure, and the resonant scanner 152 or the galvano scanner 153 is selected for use based on the positions of the pair of mirrors 154, 155.

FIG. 6 illustrates the state where the resonant scanner 152 is selected. In this case, the mirror 154 is disposed on the optical path of light exiting from the dichroic mirror 144, and the mirror 155 is disposed on the optical path of light exiting from the resonant scanner 152. Thereby, the light reflected off the mirror 154 enters the resonant scanner 152. The light deflected in a predetermined direction at the resonant scanner 152 is reflected off the mirror 155, is transparently transmitted through the dichroic mirror 162, and enters the object lens 164.

On the other hand, if the galvano scanner 153 is selected, the mirror 154 is moved aside out from the optical path of the light exiting from the dichroic mirror 618, and moreover the mirror 155 is moved aside out from between the galvano scanner 153 and the dichroic mirror 162. Thereby, the light enters the galvano scanner 153, and the light deflected at the galvano scanner 153 is transparently transmitted through the dichroic mirror 162, and enters the object lens 164.

The scanning unit 151 allows a use of a different one of the resonant scanner 152 and the galvano scanner 153 depending on an intended purpose. Note that examples of the means for moving the positions of the pair of mirrors 154, 155 include linear motors, for example, but this is not the sole example. The pair of mirrors 154, 155 may each be disposed on a corresponding turret, and the pair of mirrors 154, 155 may be moved along with rotation of the turrets. Instead of the pair of mirrors 154, 155, a pair of dichroic mirrors may be disposed. In such a case, the resonant scanner 152 can be used for light with a wavelength that is reflected off the pair of dichroic mirrors, and the galvano scanner 153 can be used for light with a wavelength that is transparently transmitted through the pair of dichroic mirrors. Note that the positions of the resonant scanner 152 and the galvano scanner 153 in FIG. 6 may be switched with one another.

Figure 7:
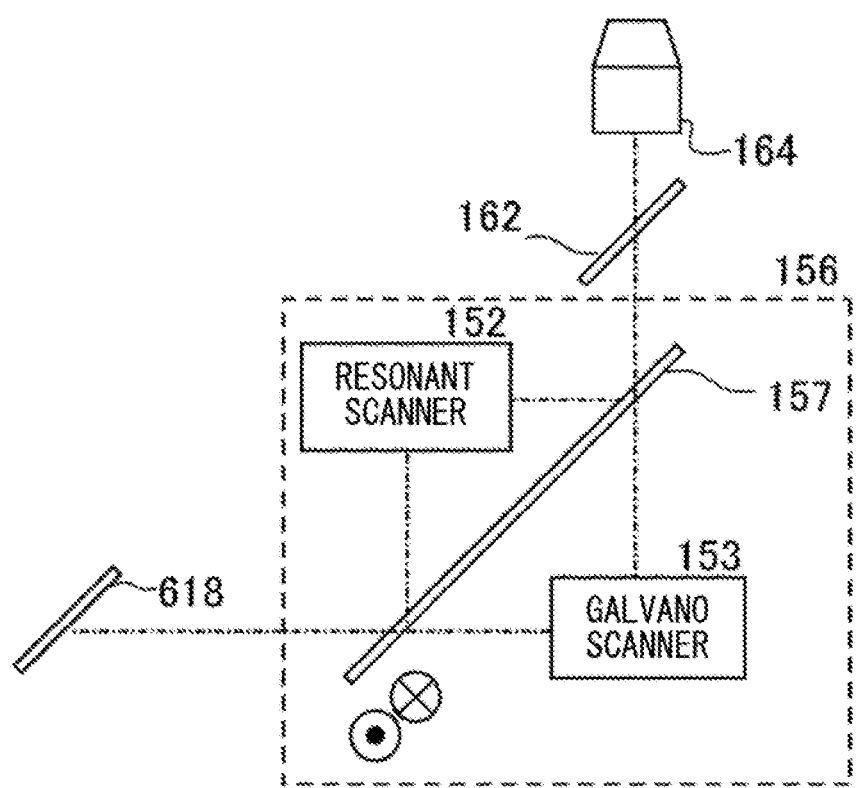
FIG. 7 illustrates still another exemplary scanning unit 156.

FIG. 7 illustrates still another exemplary scanning unit 156. Configurations in FIG. 7 that are the same as those in FIG. 6 are given the same numbers, and explanations thereof are omitted.

The scanning unit 156 has a mirror 157 formed by integrating the pair of mirrors 154, 155 of the scanning unit 151, instead of the separate mirrors 154, 155. The mirror 157 is movable in the direction perpendicular to the sheet of paper. Here, the state illustrated in FIG. 7 corresponds to the state illustrated in FIG. 6, and in the state, light is reflected off the mirror 157, and so the resonant scanner 152 is used. On the other hand, if, in the state illustrated in FIG. 7, the mirror 157 is moved in the direction perpendicular to the sheet of paper, and moved aside out from the optical path between the dichroic mirror 618 and the galvano scanner 153, and the optical path between the galvano scanner 153 and the dichroic mirror 162 simultaneously, the galvano scanner 153 becomes ready for use.

Figure 8:
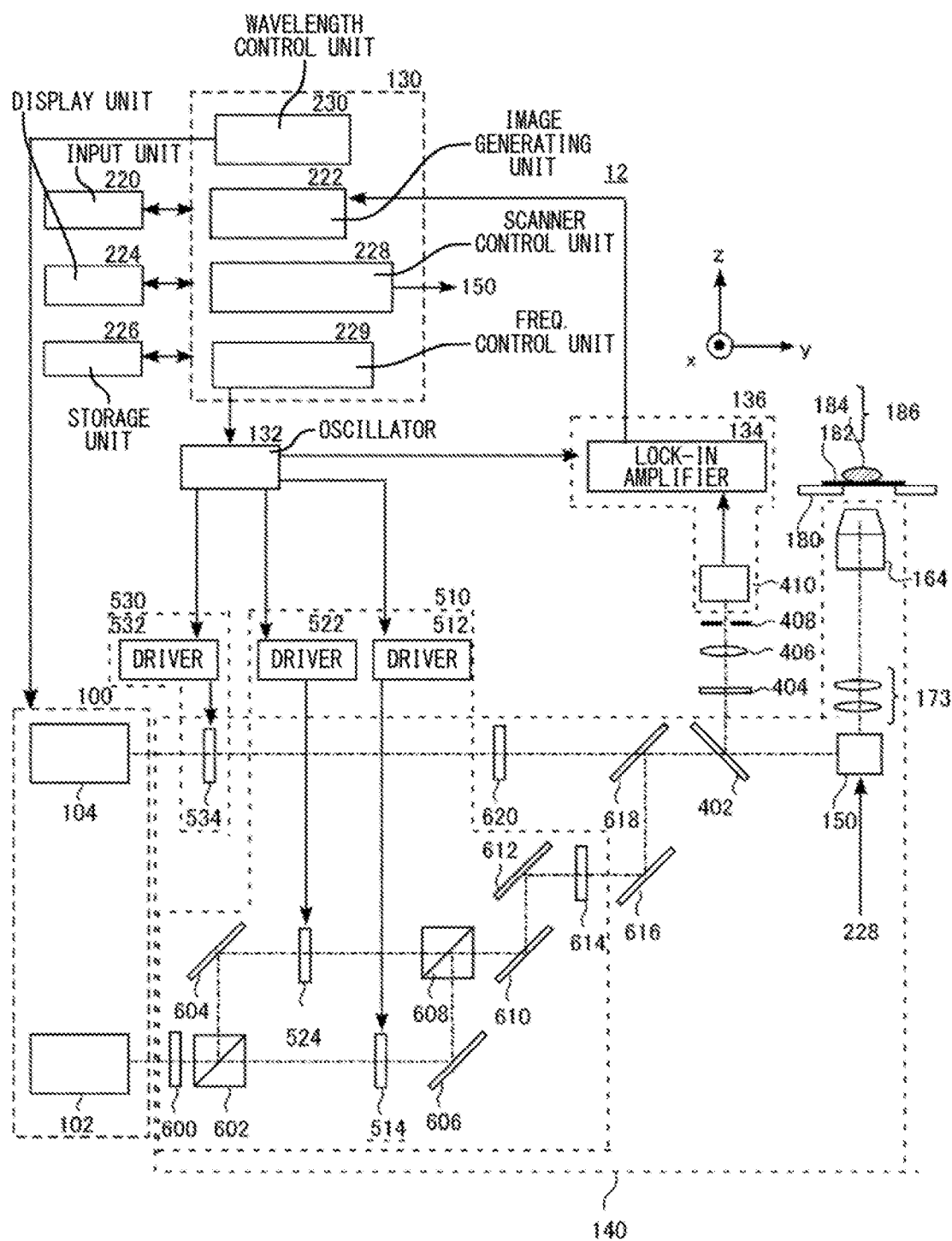
FIG. 8 is a figure illustrating the configuration of another microscope device 12.

FIG. 8 is a figure illustrating the configuration of another microscope device 12. The microscope device 12 can be used as a reduced fluorescence microscope similar to the microscope device 10, and moreover can be used also as a confocal microscope. Configurations of the microscope device 12 that are the same as the configurations in the microscope device 10 are given the same reference numerals, and explanations thereof are omitted.

The microscope device 12 has a dichroic mirror 402 that reflects fluorescence, transparently transmits therethrough pump light and probe light, and is disposed on the optical path between the dichroic mirror 618 and the scanning unit 150. Furthermore, the microscope device 12 has an optical filter 404, a lens 406, and a light-receiving unit 410 which light reflected off the dichroic mirror 402 enters. The optical filter 404, and light-receiving unit 410 may have the same configurations as those of the optical filter 166, and light-receiving unit 174 of the microscope device 10. The microscope device 12 further has a pinhole 408. The pinhole 408 is disposed at a position which is conjugate with the observed subject 184. The lens 406 concentrates light onto the pinhole 408. In addition, the light-receiving unit 410 is placed in proximity to the pinhole 408. Alternatively, it may be placed at a position which is substantially conjugate with the pinhole using an unillustrated lens.

The microscope device 12 further has a wavelength control unit 230 that controls the wavelengths of light of the laser light sources 102, 104.

With the above-mentioned configuration, fluorescence from the observed subject 184 passes through the scanning unit 150, is reflected off the dichroic mirror 402, and is received by the light-receiving unit 410 after passing through the optical filter 404, lens 406, and pinhole 408. Thereby, even if the observation position of the observed subject 184 is changed by the scanning unit 150, the spot position at the pinhole 408 remains unchanged due to descanning by the scanning unit 150. The hole size of the pinhole 408 is variable, and details thereof are described below.

Figure 9:
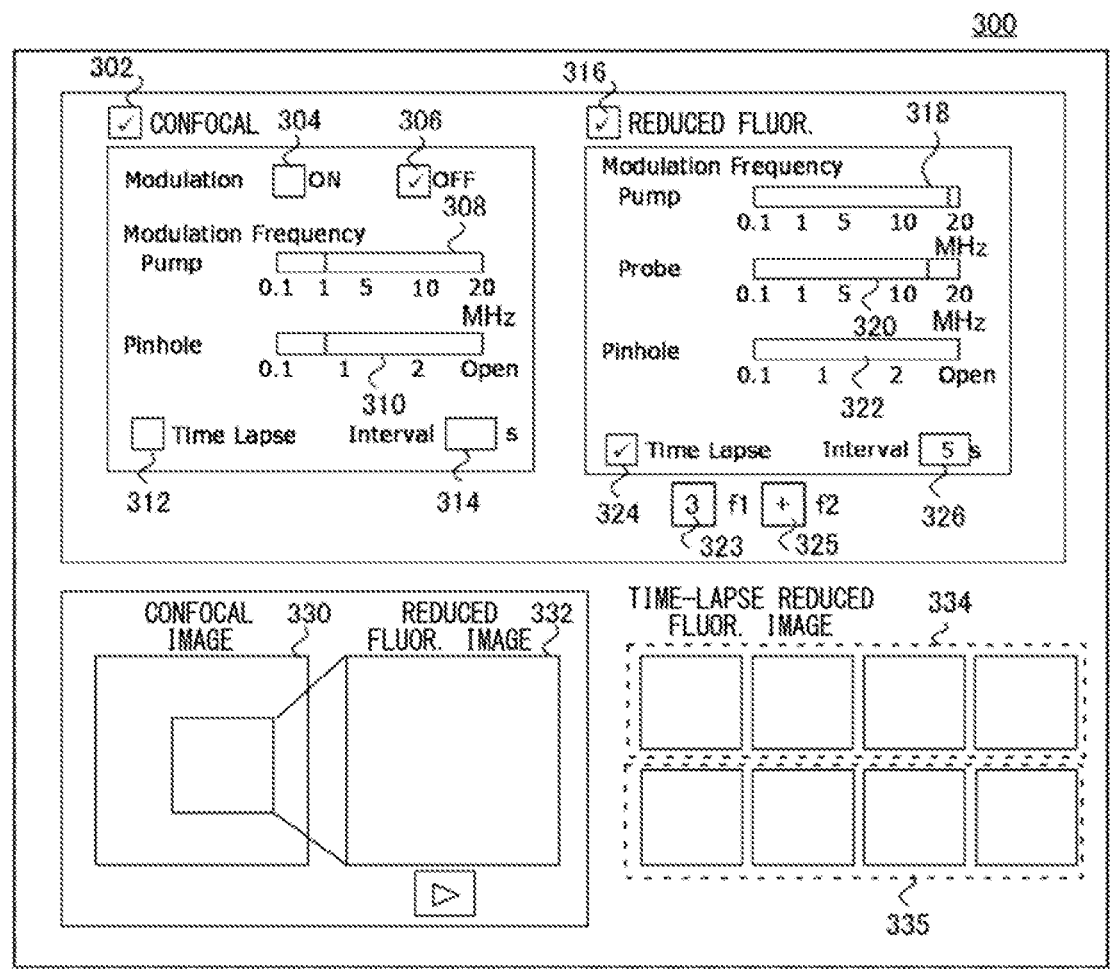
FIG. 9 is an exemplary GUI screen 300 used in the microscope device 12.

FIG. 9 is an exemplary GUI screen 300 used in the microscope device 12. The GUI screen 300 is displayed on the display unit 224, and input from a user is accepted using the input unit 220.

A check box 302 is an input field for selecting whether or not to acquire a confocal observation image. A check box 304 is an input field for specifying that pump light is to be modulated in confocal observation, and a check box 306 is an input field for specifying that the pump light is not to be modulated.

An input field 308 is an input field for the modulation frequency for pump light, and includes a specified modulation frequency indicated by a vertical bold line, along with scales accompanied by numbers in the unit of MHz. An input field 310 is an input field for specifying the size of the pinhole. "OPEN" at the input field 310 indicates that the hole size is the maximum. Furthermore, a specified hole size is indicated by a vertical bold line, along with scales for the size, with "1" indicating the airy size. Here, the airy size means the size of a light spot of diffraction limitation that is determined by a wavelength and a numerical aperture, and is a standardized value of pinhole diameter.

Furthermore, a check box 312 is an input field for selecting whether or not to acquire time-lapse images of confocal observation. An input field 314 is an input field for time intervals for time-lapse image acquisition.

A check box 316 is an input field for selecting whether or not to acquire a reduced fluorescence observation image. An input field 318 is an input field for the modulation frequency for pump light, and includes a specified modulation frequency indicated by a vertical bold line, along with scales accompanied by numbers in the unit of MHz. An input field 320 is an input field for the modulation frequency for probe light, and includes a specified modulation frequency indicated by a vertical bold line, along with scales accompanied by numbers in the unit of MHz.

An input field 322 is an input field for the hole size of the pinhole 408 in reduced fluorescence observation, and has the same configuration as that of the input field 310. In addition, a check box 324 and an input field 326 are input fields about time lapse in reduced fluorescence observation, and have the same configurations as those of the check box 312, and input field 314.

Input fields 323, 325 are fields where demodulation frequencies are input. One or more positive numbers can be input in the input field 323. On the other hand, the positive sign or negative sign can be selected in the input field 325. FIG. 9 illustrates a situation where "3" is input in the input field 323, and the positive sign is selected in the input field 325, meaning that 3f1+f2 is set as the demodulation frequency. Note that if "1" is input in the input field 323, a typical reduced fluorescence microscope image can be acquired.

The GUI screen 300 includes a confocal observation image 330, and a reduced fluorescence observation image 332 that are displayed next to each other. Instead, the images may be displayed as a superimposed image. In addition, a link to the other may be given to each of the images, and, for example, by clicking a region of interest in the confocal observation image 330, the reduced fluorescence observation image 332 may be displayed. Furthermore, if time-lapse image acquisition is selected for confocal observation, time-lapse images 334 are displayed next to each other in the order of time. Similarly, if time-lapse image acquisition is selected for reduced fluorescence observation, time-lapse images 335 are displayed next to each other in the order of time.

Figure 10:
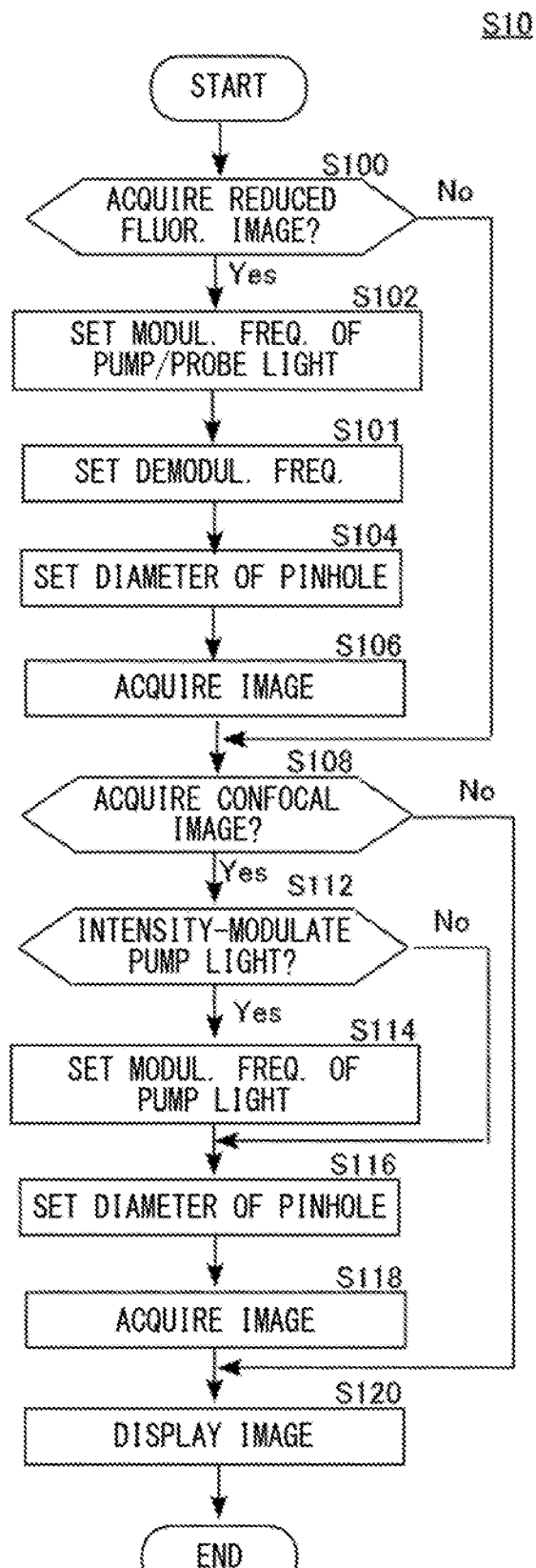
FIG. 10 is a flowchart illustrating an exemplary operation of the microscope device 12.

FIG. 10 is a flowchart illustrating an exemplary operation (S10) of the microscope device 12.

In the flowchart S10, the control unit 130 determines, based on input in the check box 316 on the GUI screen 300, whether or not to acquire a reduced fluorescence observation image (S100). If the result of the determination at Step S100 is Yes, the control unit 130 sets, in the oscillator 132 and based on input in the input fields 318, 320, the modulation frequencies for pump light and probe light for reduced fluorescence observation (S102). Furthermore, the control unit 130 sets, in the oscillator 132, the demodulation frequencies based on input in the input fields 323, 325 (S101).

The control unit 130 sets the diameter of the pinhole 408 (S104). At the time of reduced fluorescence observation, the pinhole 408 is opened in the default setting, that is, "OPEN" is set in the input field 322 in FIG. 10 in the default setting. If a user altered the value of the input field 322 from the default setting, the size of the pinhole 408 is set based on the value after the alteration. Since, by opening the pinhole 408, it is also possible at the time of reduced fluorescence observation to sense fluorescence whose imaging relationship has been disturbed by scattering or the like even if the fluorescence is produced from a focal surface which is the pinhole conjugate plane, more photons can be sensed; as a result, enhancement of the signal-to-noise ratio becomes possible.

Based on the above-mentioned settings, a reduced fluorescence observation image is acquired (S106). The method of acquiring a reduced fluorescence observation image is the same as that explained in relation to the microscope device 10, and explanations thereof are omitted.

After Step S106 or if the result of the determination at Step S100 is No, it is determined, based on input in the check box 302, whether or not to acquire a confocal observation image (S108). If it is determined to acquire a confocal observation image (S108: Yes), it is determined, based on the check boxes 304, 306, whether or not to modulate pump light used for confocal observation (S112). If it is determined to perform the modulation (S112: Yes), a modulation frequency input in the input field 308 is set (S114).

After Step S114 or if it is determined at Step S112 not to modulate pump light (S112: No), the diameter of the pinhole 408 is set based on input by a user in the input field 310 (S116).

A confocal observation image is acquired based on the above-mentioned settings (S118). Explaining in more details, by setting the state of only one of the AOFS 514, 524 to the ON-state for pump light or intensity-modulating pump light, and by setting the state of probe light to the OFF-state, fluorescence is sensed at the sensing unit 136 pixel by pixel while the scanning unit 150 is scanning the observed subject 184. Results of the sensing are stored in the storage unit 226 in association with positional information. If pump light is not intensity-modulated, output from the light-receiving unit 410 is stored in the storage unit 226 in association with positional information without passing through the lock-in amplifier.

The image generating unit 222 reads out the sensing results associated with the positional information from the storage unit 226, generates the confocal observation image 330 and the reduced fluorescence observation image 332, and displays the images on the display unit 224 (S120).

Furthermore, if an instruction to acquire confocal observation time-lapse images is accepted at the check box 312, the microscope device 12 executes confocal observation at the time intervals set in the input field 314, and generates individual observation images. Similarly, if an instruction to acquire reduced fluorescence observation time-lapse images is accepted at the check box 324, the microscope device 12 executes reduced fluorescence observation at the time intervals set in the input field 326, and generates individual observation images.

Note that, in another possible configuration, an image of the observed subject 184 may be acquired through confocal observation over a large field of view, and a partial region in the confocal observation image may be specified to acquire a reduced fluorescence observation image. In this case, an image may be acquired through confocal observation, and a range suited for reduced fluorescence observation may be selected automatically.

Figure 11:
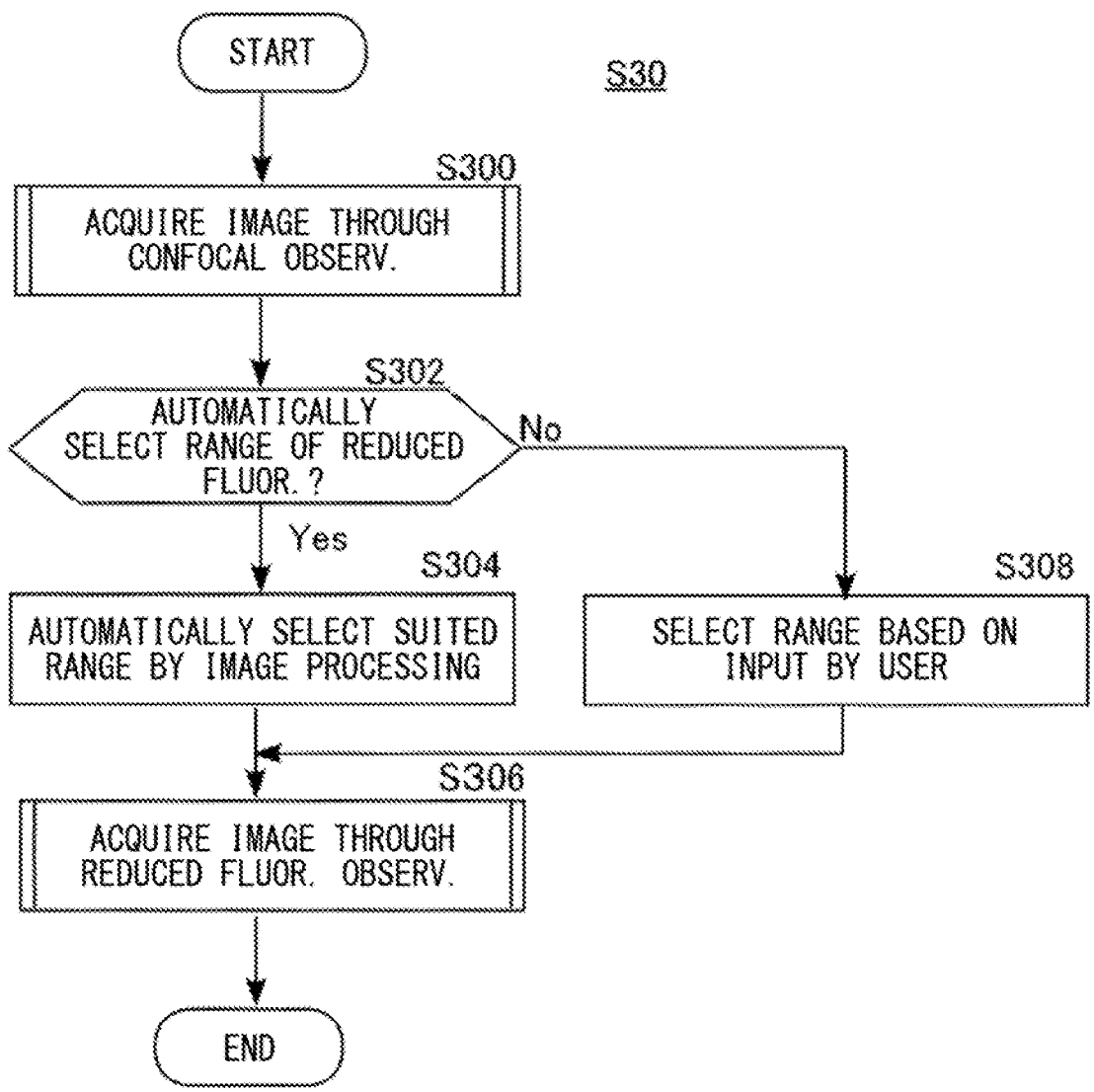
FIG. 11 is a flowchart of an operation of selecting a range of reduced fluorescence observation based on confocal observation.

FIG. 11 is a flowchart of an operation (S30) of selecting a range of reduced fluorescence observation based on confocal observation. First, an image is acquired through confocal observation (S300). In this case, Steps S112 to S118 in the operation (S10) in FIG. 10 are executed. Next, it is determined, based on input from a user, whether or not to automatically select a range of reduced fluorescence observation (S302).

If it is determined to perform the automatic selection (S302: Yes), the confocal image undergoes image processing analysis, and a range suited for reduced fluorescence observation is selected. For example, the image may undergo differential filtering, and a region where many peaks are produced is selected.

On the other hand, if it is determined not to perform the automatic selection (S302: No), a region of reduced fluorescence observation is set based on selection by a user (S308). In this case, selection of a region may be accepted on the confocal observation image 330 illustrated in FIG. 9.

Reduced fluorescence observation is executed in the region set at Step S304 or S308 to acquire an observation image (S306). In this case, Steps S102 to S106 in the operation (S10) in FIG. 10 are executed.

Figure 12:
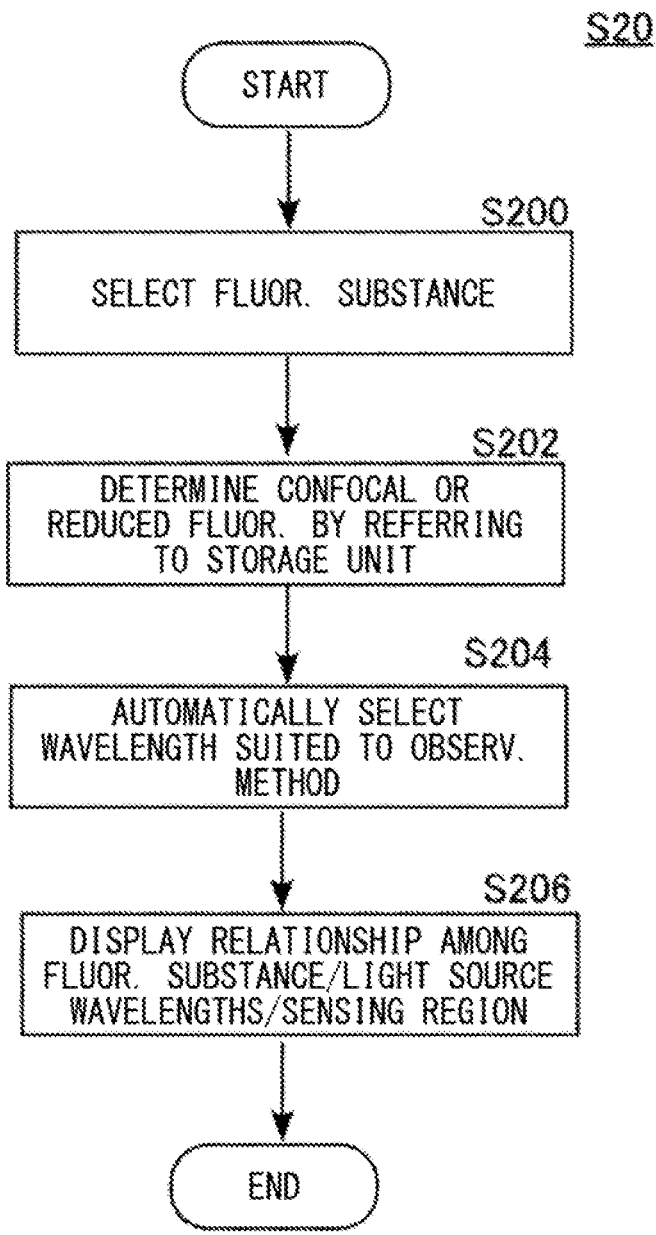
FIG. 12 is a flowchart of an operation of automatically selecting whether to perform confocal observation or to perform reduced fluorescence observation in the microscope device 12.
Figure 13:
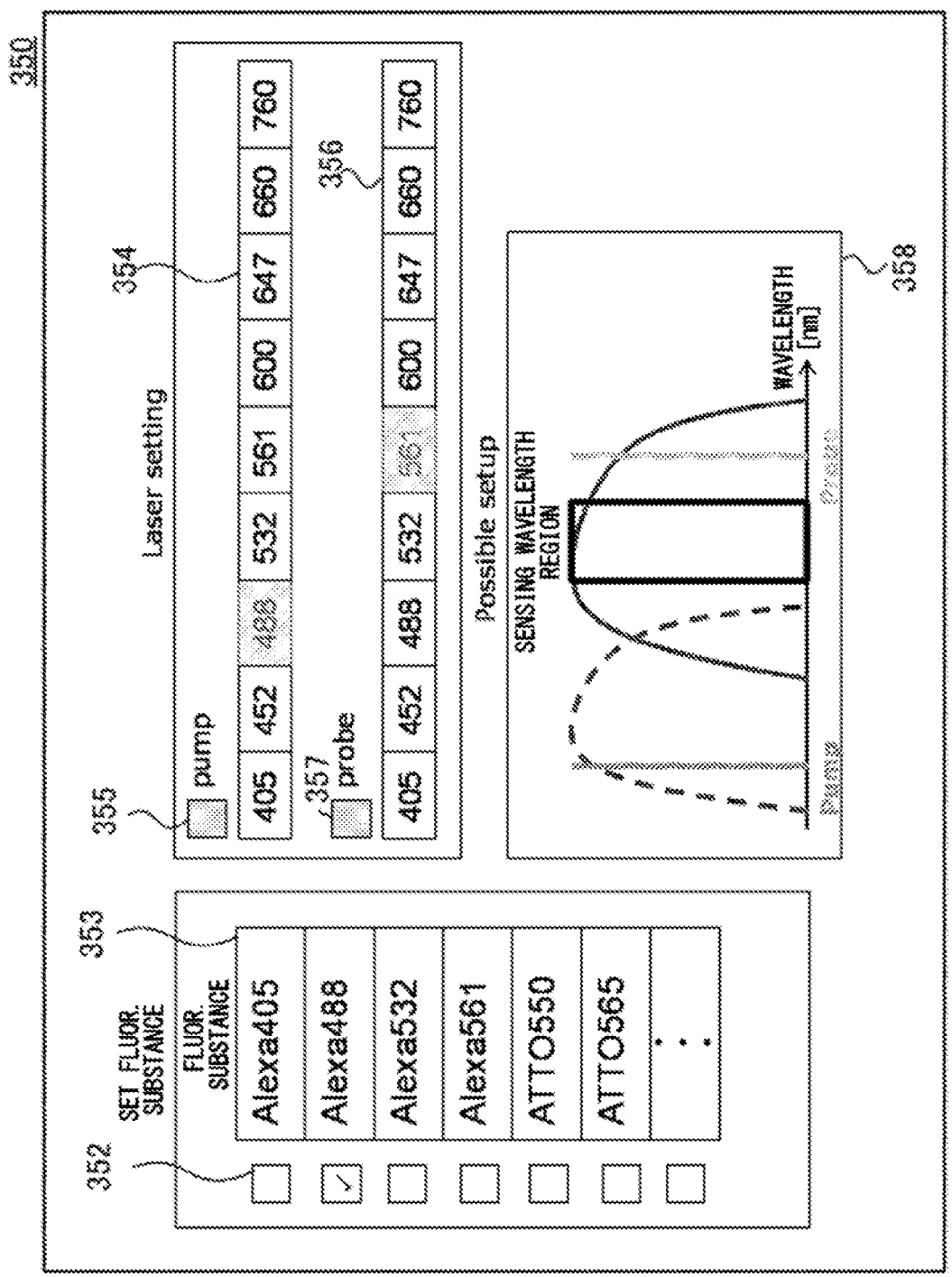
FIG. 13 illustrates a GUI screen 350 used in the operation.

FIG. 12 is a flowchart of an operation (S20) of automatically selecting whether to perform confocal observation or to perform reduced fluorescence observation in the microscope device 12, and FIG. 13 illustrates a GUI screen 350 used in the operation.

The storage unit 226 stores information that is associated with names of fluorescent substances, and indicates whether confocal observation is preferable or reduced fluorescence observation is preferable, and the wavelength of pump light in the case of confocal observation, or the wavelengths of pump light and probe light in the case of reduced fluorescence observation. The GUI screen 350 displays the names 353 of fluorescent substances stored in the storage unit 226 along with check boxes 352.

A check mark placed in a check box 352 by a user indicates a selected fluorescent substance (S200). The control unit 130 determines whether confocal observation is preferable or reduced fluorescence observation is preferable depending on the selected fluorescent substance by referring to the storage unit 226 (S202). If it is determined that confocal observation is preferable, a box 355 for pump light is colored on the GUI screen 350, and the wavelength of pump light corresponding to the fluorescent substance is automatically selected, and displayed on a display field 354 (S204). In this case, a box 357 for probe light is white, and a display field 356 for a wavelength is grayed out. If it is determined that reduced fluorescence observation is preferable, the box 355 for pump light is colored on the GUI screen 350, the wavelength of pump light corresponding to the fluorescent substance is automatically selected, and displayed in the display field 354, moreover the box 357 for probe light is also colored, and the wavelength of probe light corresponding to the fluorescent substance is automatically selected, and displayed in the display field 356 (S204). In either case, a relationship among the absorption band, and fluorescence band of the fluorescent substance, the wavelengths of the light sources, and a sensing region is illustrated in a display field 358 (S206).

If it is determined that reduced fluorescence observation is preferable, the wavelength control unit 230 sets the wavelengths of light from the laser light sources 102, 104 based on an instruction from a user about execution. Furthermore, the frequency control unit 229 sets modulation frequencies in the oscillator 132. In this case, input of modulation frequencies may be accepted on the GUI screen 300 illustrated in FIG. 9, or modulation frequencies may be stored in the storage unit 226 in association with fluorescent substances, and a modulation frequency may be automatically set according to selection of a fluorescent substance. Based on the above-mentioned settings, a reduced fluorescence observation image is acquired in a similar manner to Steps S102 to S106 in FIG. 10.

On the other hand, if it is determined that confocal observation is preferable, the wavelength control unit 230 sets the wavelengths of light from the laser light source 102 based on an instruction from a user about execution. Based on the above-mentioned settings, a confocal observation image is acquired in a similar manner to Steps S112 to S118 in FIG. 10.

Figure 14:
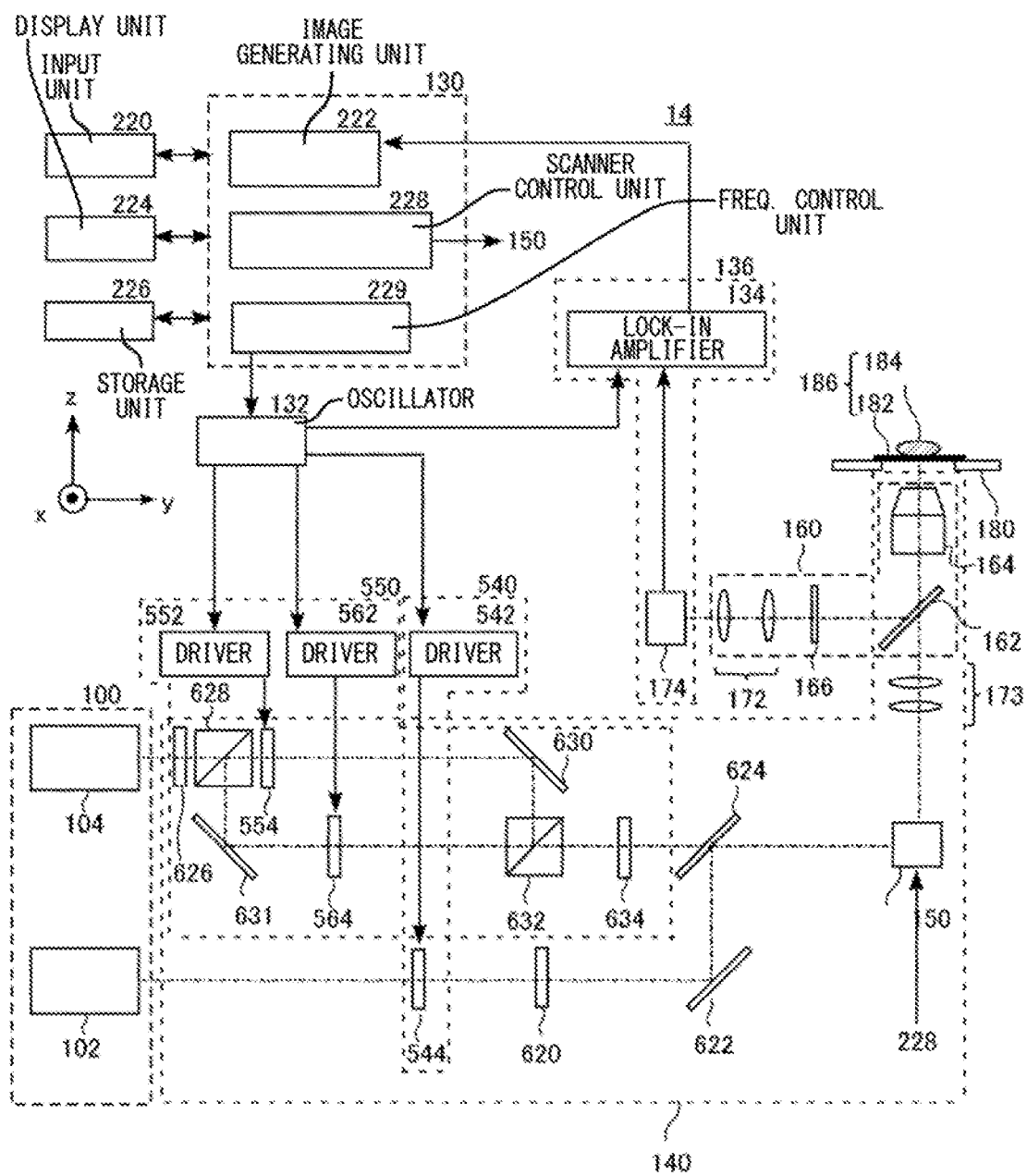
FIG. 14 is a figure illustrating the configuration of still another microscope device 14.

FIG. 14 is a figure illustrating the configuration of still another microscope device 14. Configurations of the microscope device 14 that are the same as the configurations in the microscope devices 10, 12 are given the same reference numerals, and explanations thereof are omitted. Similarly, the microscope device 14 senses a reduced fluorescence signal having undergone stimulated absorption and stimulated emission induced by probe light multiple times by lock-in sensing.

In the microscope device 14, the method of intensity-modulation for pump light, and the method of intensity-modulation for probe light in the microscope device 10 are replaced with one another. Specifically, a first intensity-modulating unit 540 that intensity-modulates pump light has a driver 542, and an AOM 544. Their functions are the same as corresponding ones of the second intensity-modulating unit 530 in the microscope device 10, but pump light is intensity-modulated at the frequency f1 in the microscope device 14.

On the other hand, a second intensity-modulating unit 550 that intensity-modulates probe light has drivers 552, 562, AOFSs 554, 564, a half-wave plate 626, polarization beam splitters 628, 632, mirrors 630, 631, and a polarizing plate 634. Their functions are the same as corresponding ones of the first intensity-modulating unit 510 in the microscope device 10, but probe light is intensity-modulated at the frequency f2 in the microscope device 14.

Figure 15:
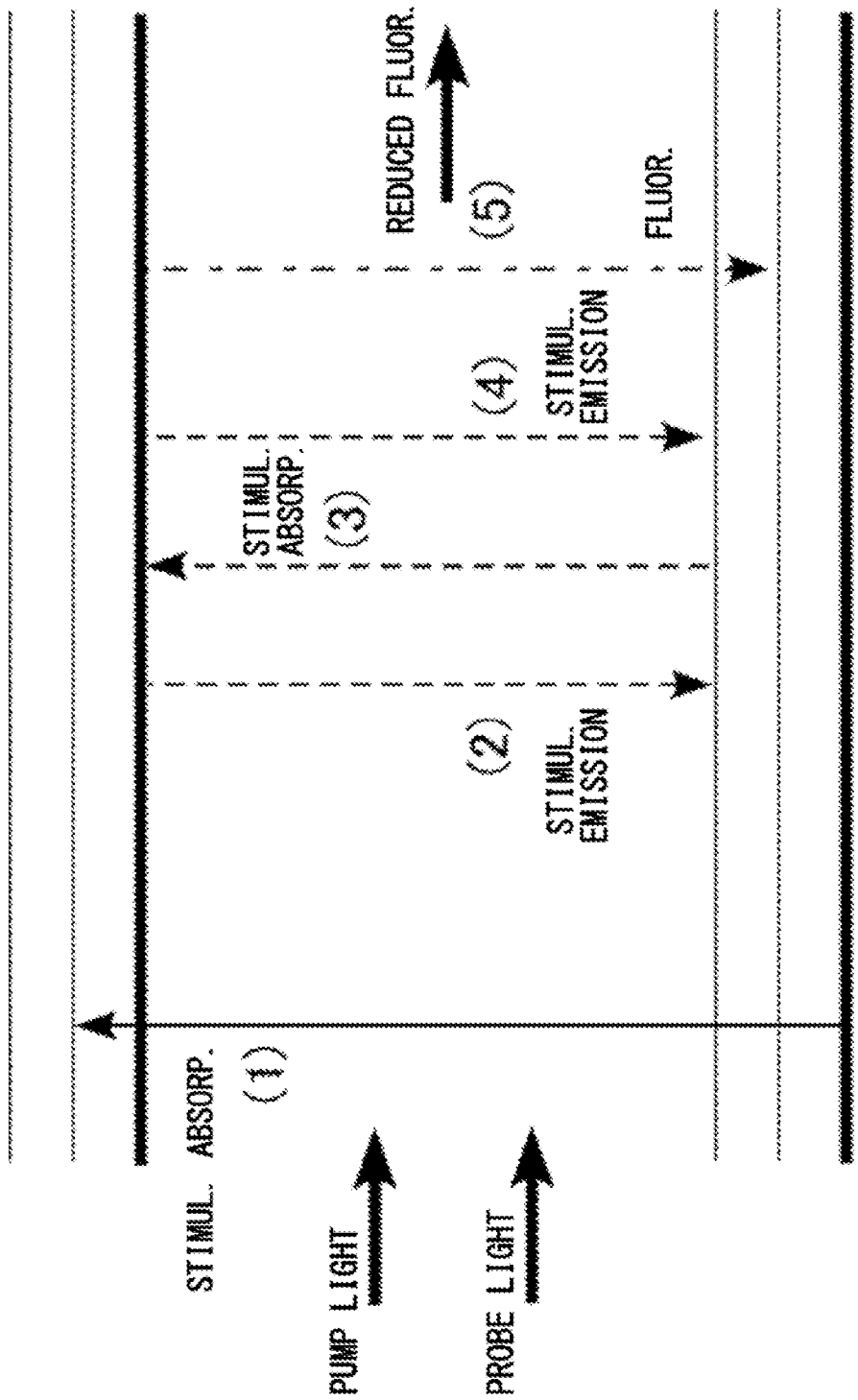
FIG. 15 is a state transition diagram.

Principles of observation based on reduced fluorescence using the microscope device 14 are explained with reference to FIG. 15 to FIG. 17. FIG. 15 is a state transition diagram. FIG. 17 illustrates a signal generation region simulation result.

As illustrated in FIG. 15, a fluorescent sample is irradiated with pump light that excites the sample, and probe light that induces stimulated emission. The pump light, and probe light are intensity-modulated at the frequencies f1, f2 for a length of time, and their time waveforms are represented by the formulae (1.1), (1.2) similar to the microscope device 10.

At this time, in an interaction between the light and the substance, the following processes:

(step 1) Stimulated absorption induced by pump light (1);
(step 2) Stimulated emission induced by probe light (2);
(step 3) Stimulated absorption induced by probe light (3); and
(step 4) Stimulated emission induced by probe light (4);

occur in a time sequence at a certain probability as illustrated in FIG. 15. Reduced fluorescence signals produced as a result of this are defined as CSRF (Cyclic Stimulated emission Reduced Fluorescence) signals (5), and then:

[Formula 8]

$$I_{CSRF}(t) \propto I_{Pump}I_{Probe}^3 = I_1 I_2^3 [1 + m\cos f_1 t][1 + n\cos f_2 t]^3 = \quad (2.1)$$
$$I_1 I_2^3 [1 + m\cos f_1 t][1 + 3n\cos f_2 t + 3n^2 \cos^2 f_2 t + n^3 \cos^3 f_2 t] =$$
$$I_1 I_2^3 \left[ 1 + \frac{3}{2}n^2 + \left(3n + \frac{3}{4}n^3\right)\cos f_2 t + \frac{3}{2}n^2 \cos 2 f_2 t + \right.$$
$$\left. \frac{3}{4}n^3 \cos 3 f_2 t + \left(n + \frac{3}{2}mn^2\right)\cos f_1 t \right] +$$
$$\frac{1}{2} I_1 I_2^3 mn \left(3 + \frac{3}{4}n^2\right)[\cos(f_1 - f_2)t + \cos(f_1 + f_2)t] +$$
$$\frac{3}{4} I_1 I_2^3 mn^2 [\cos(f_1 - 2f_2)t + \cos(f_1 + 2f_2)t] +$$
$$\frac{3}{8} I_1 I_2^3 mn^3 [\cos(f_1 - 3f_2)t + \cos(f_1 + 3f_2)t]$$

In the fluorescent sample, such an interaction between the light and the substance is constantly repeated.

By demodulation at f1±2f2, or f1±3f2 according to the formula (2.1), typical reduced fluorescence signals can be removed, and only CSRF signals can be sensed. An advantage of sensing these signals is that, since the sensing signals are obtained as a result of multiple products of pump light, and probe light, the signal generation region is restricted. In addition, since each of the signals is proportional to each of the first power of I1, and the third power of I2, the signal quantity is significantly increased by raising the probe light intensity I2, and an advantageous signal-to-noise ratio can also be attained.

Figure 16:
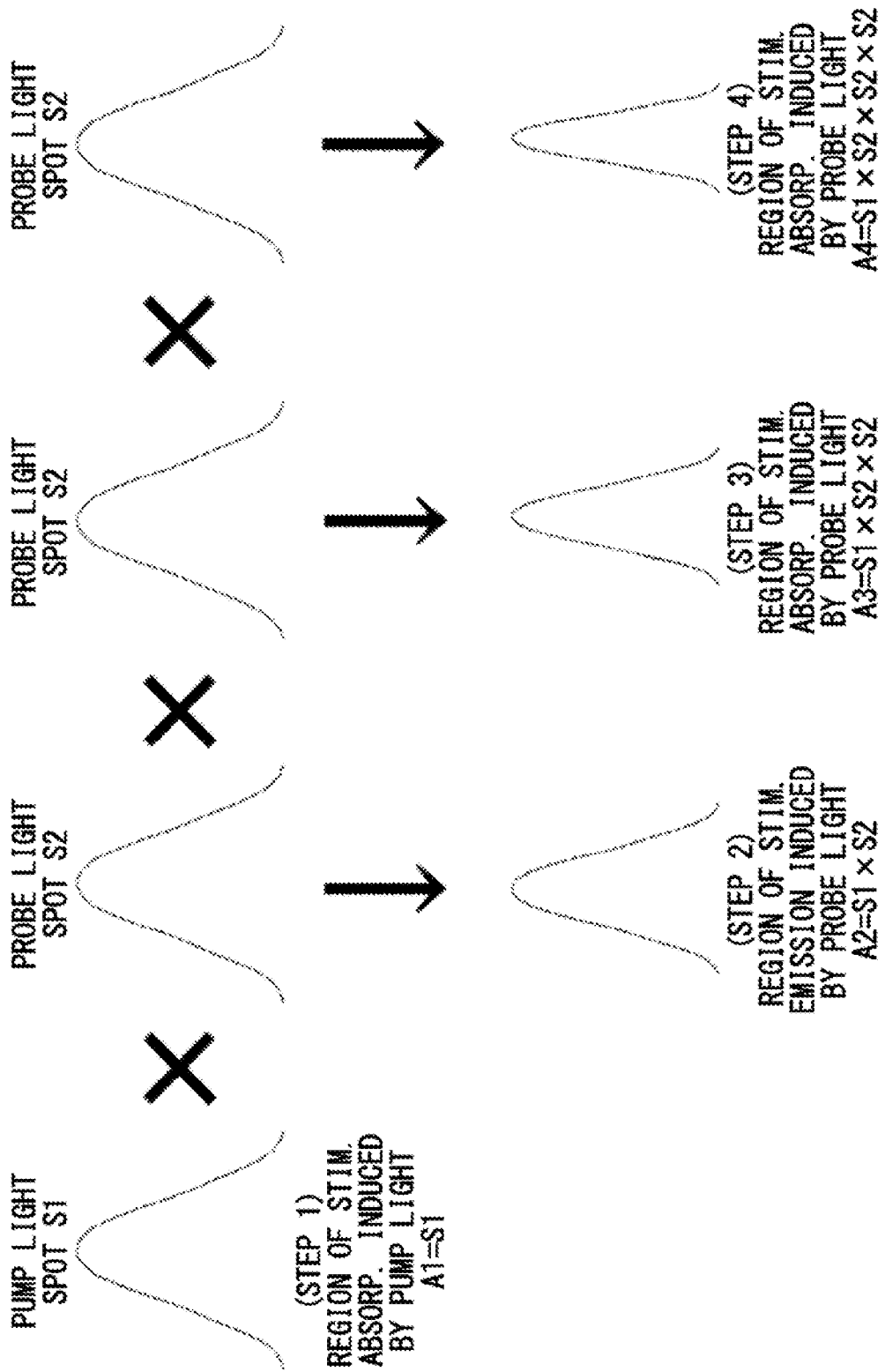
FIG. 16 is a figure for explaining principles of resolution enhancement.
Figure 17:
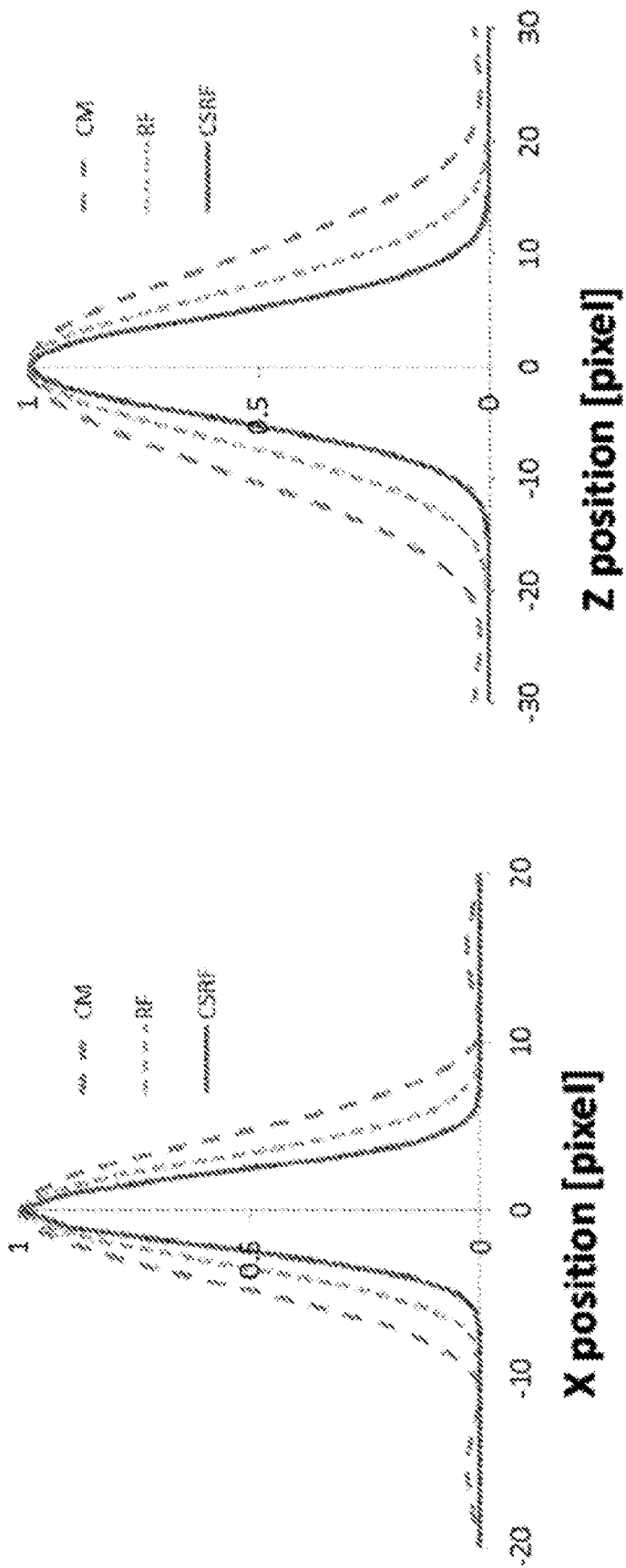
FIG. 17 illustrates a signal generation region simulation result.

FIG. 16 is a figure for explaining principles of resolution enhancement using CSRF signals. S1, and S2 are defined as the intensity distributions of light spots of pump light, and probe light, respectively.

Step 1

If A1 is defined as the generation distribution indicating generation of stimulated absorption induced by pump light, since the generation distribution is equal to the intensity distribution of pump light:

[Formula 9]

$$A_1 = S_1 \quad (2.2)$$

Step 2

A2 is defined as the generation distribution indicating generation of stimulated emission induced by probe light. Since this signal generation distribution is equal to the product of the generation distribution of stimulated absorption induced by pump light at Step 1, and the generation distribution of stimulated emission induced by probe light:

[Formula 10]

$$A_2 = S_1 S_2 \quad (2.3)$$

Step 3

A3 is defined as the generation distribution indicating generation of stimulated absorption induced by probe light. Since this signal generation distribution is equal to the product of the generation distribution of stimulated absorption induced by probe light at Step 1, the generation distribution of stimulated emission induced by pump light at Step 2, and the generation distribution of stimulated absorption induced by probe light:

[Formula 11]

$$A_3 = S_1 S_2^2 \quad (2.4)$$

Step 4

A4 is defined as the generation distribution indicating generation of stimulated emission induced by probe light. Since this signal generation distribution is produced as the product of the generation distribution of stimulated absorption induced by pump light at Step 1, the generation distribution of stimulated emission induced by probe light at Step 2, the generation distribution of stimulated absorption induced by probe light at Step 3, and the generation distribution of stimulated emission induced by probe light:

[Formula 12]

$$A_4 = S_1 S_2^3 \quad (2.5)$$

This generation distribution A4 is equivalent to the generation distribution of CSRF signals visualized by lock-in sensing. In this manner, by sensing reduced fluorescence signals produced through stimulated absorption and stimulated emission induced by probe light multiple times, it is possible to emphasize contribution of fluorescence generation from the center of a light spot, and to de-emphasize contribution of fluorescence generation from the perimeter of the light spot as illustrated in FIG. 16; therefore, the region of signal generation from the observed subject 184 can be restricted; as a result, the resolution can be enhanced.

FIG. 17 illustrates a signal generation region simulation result. For comparison, signal generation regions of a typical confocal microscope (CM), and a reduced fluorescence (RF) microscope are illustrated. It can be known that, due to the effect attained by producing signals in the distribution as represented by the multiple products of pump light and probe light, the signal generation region of CSRF becomes sharp in both the X direction, and Z direction.

Note that although it is assumed here that reduced fluorescence signals produced by (Step 4) stimulated emission induced by probe light after (step 1) stimulated absorption induced by pump light, (step 2) stimulated emission induced by probe light, and (step 3) stimulated absorption induced by probe light are sensed, reduced fluorescence signals produced by stimulated emission induced by probe light after further stimulated emission induced by probe light, and stimulated absorption induced by probe light after step 3 may be sensed. In this case, the demodulation frequencies are desirably f1±4f2, f1±5f2. Since each of the signals is proportional to each of the first power of I1, and the fifth power of I2, the signal quantity is significantly increased by raising the probe light intensity I2, and the signal-to-noise ratio can also be enhanced. If the above-mentioned matters are represented in a generalized form, lock-in sensing is performed using a demodulation frequency of f1±j×f2 (j is a positive integer which is equal to or larger than two), and this makes it possible to sense reduced fluorescence signals with higher spatial resolution.

Figure 18:
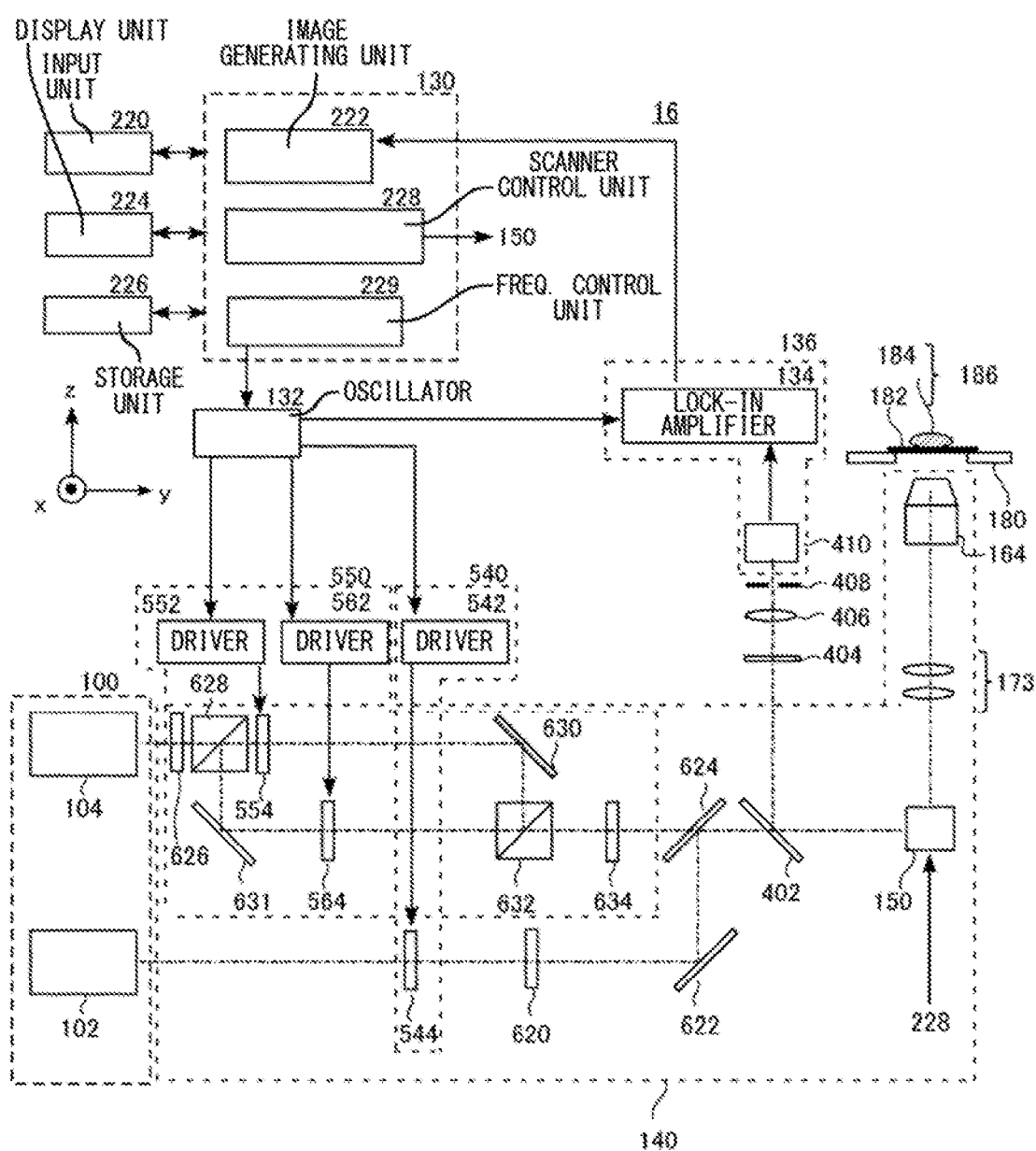
FIG. 18 is a figure illustrating the configuration of still another microscope device 16.

FIG. 18 is a figure illustrating the configuration of still another microscope device 16. The microscope device 16 can be used as a reduced fluorescence microscope similar to the microscope device 14, and moreover can be used also as a confocal microscope. Configurations of the microscope device 14 that are the same as the configurations in the microscope devices 10, 12, 14 are given the same reference numerals, and explanations thereof are omitted.

The microscope device 16 has the dichroic mirror 402 that reflects fluorescence, transparently transmits therethrough pump light and probe light, and is disposed on the optical path between the dichroic mirror 624 and the scanning unit 150. Furthermore, the microscope device 16 has the optical filter 404, lens 406, and light-receiving unit 410 which light reflected off the dichroic mirror 402 enters. The optical filter 404, lens 406, and light-receiving unit 410 may have the same configurations as those of the optical filter 166, and light-receiving unit 174 of the microscope device 14. The microscope device 16 further has the pinhole 408. The pinhole 408 can be placed at a position which is conjugate with the specimen in the observation optical system. The light-receiving unit 410 is placed in proximity to the pinhole 408. The lens 406 concentrates light onto the pinhole 408.

With the above-mentioned configuration, fluorescence from the observed subject 184 passes through the scanning unit 150, is reflected off the dichroic mirror 402, and is received by the light-receiving unit 410 after passing through the optical filter 404, lens 406, and pinhole 408. Thereby, even if the observation position of the observed subject 184 is changed by the scanning unit 150, the spot position at the light-receiving unit 410 remains unchanged due to descanning by the scanning unit 150. The hole size of the pinhole 408 is variable, details thereof are the same as those for the microscope device 12, and so explanations thereof are omitted.

Figure 19:
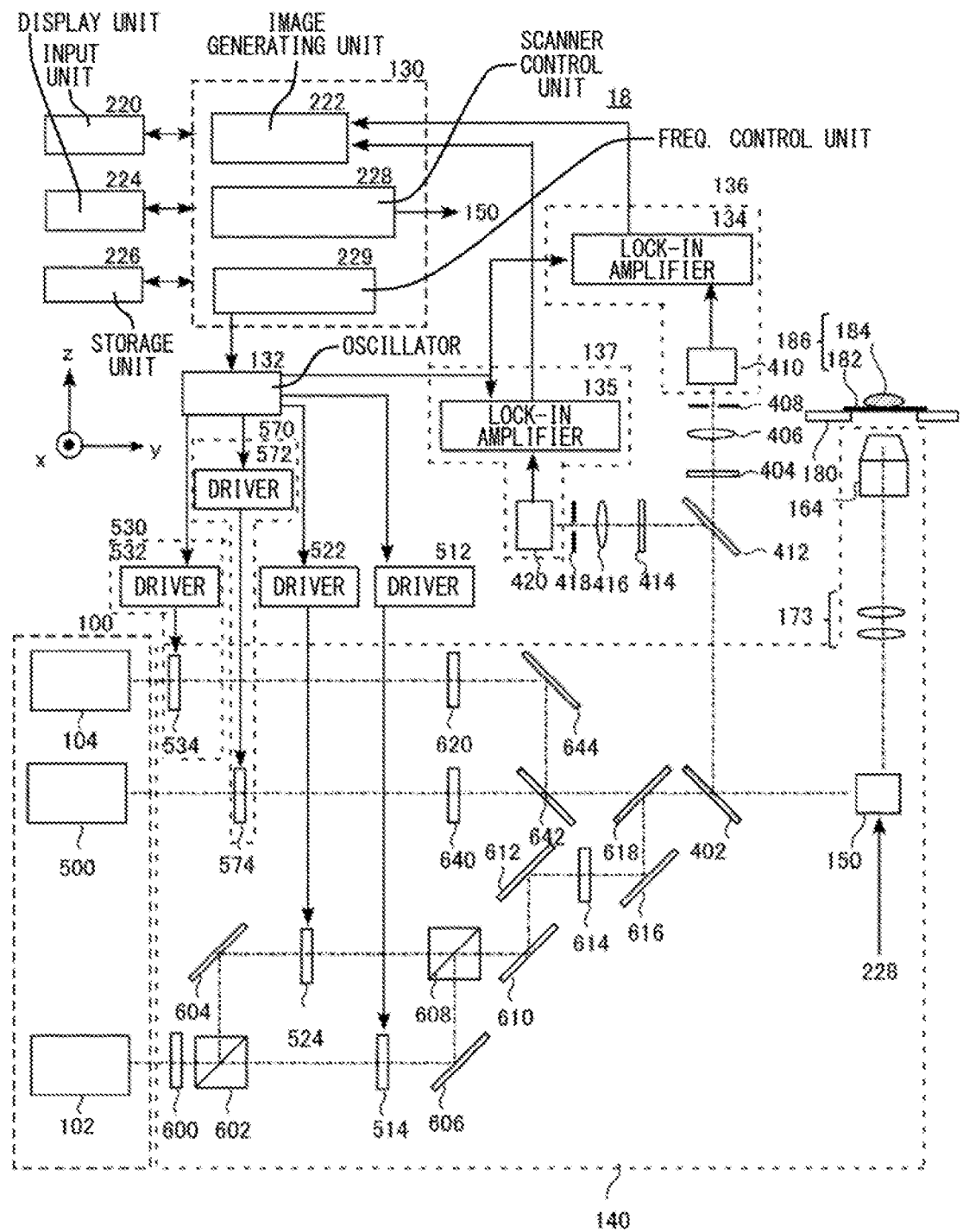
FIG. 19 is a figure illustrating the configuration of still another microscope device 18.
Figure 20:
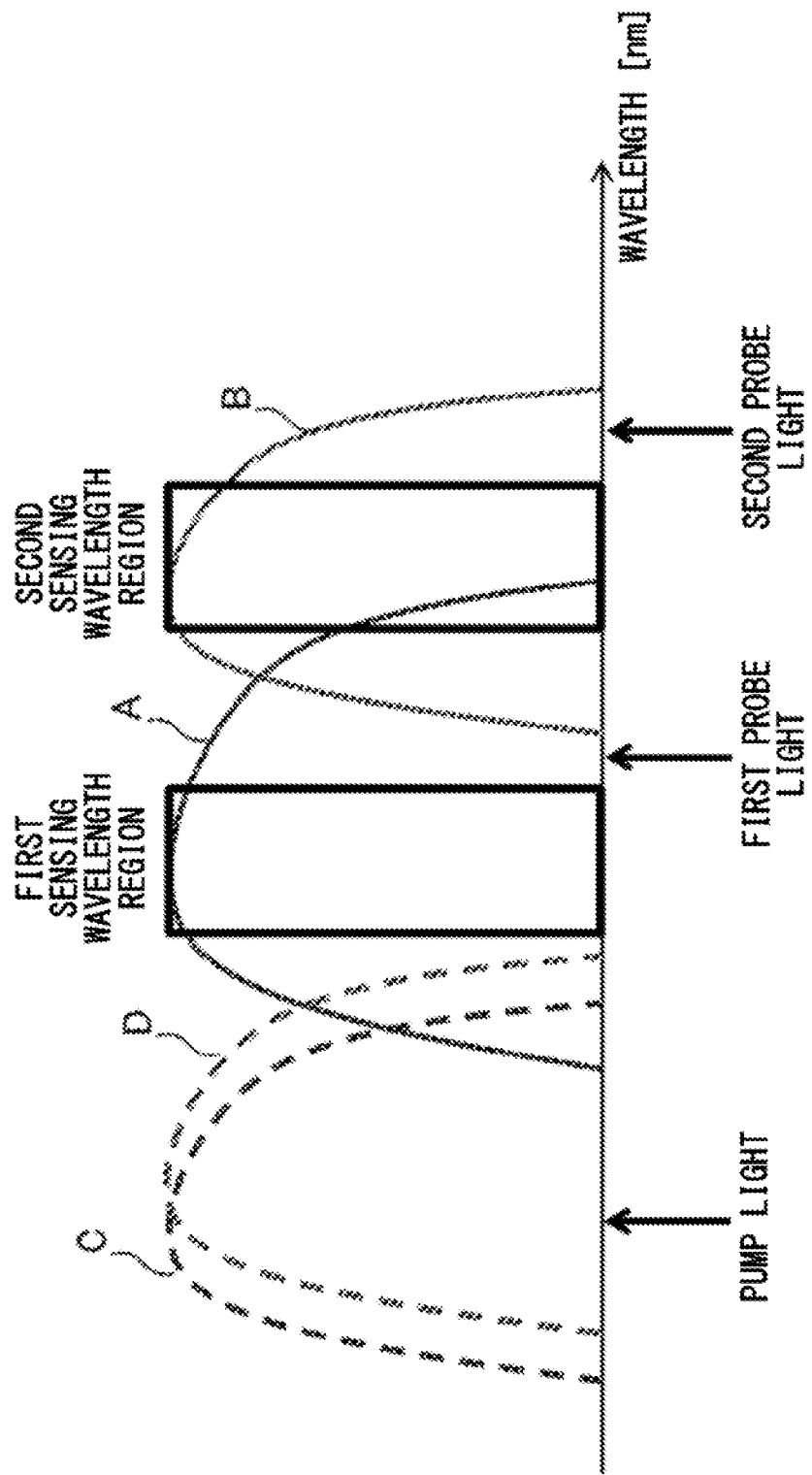
FIG. 20 illustrates a relationship among the excitation/fluorescence spectrum of each fluorescent substance, and the wavelengths of pump light, probe light, and sensing wavelength regions.

FIG. 19 is a figure illustrating the configuration of still another microscope device 18, and FIG. 20 illustrates a relationship among the excitation/fluorescence spectrum of each fluorescent substance, and the wavelengths of pump light, probe light, and sensing wavelength regions. The microscope device 18 is used for reduced fluorescence observation based on multicolor fluorescence. Particularly, the microscope device 18 is used when there are two types of fluorescent substances, and a common pump light is used, and different probe lights are used. Configurations of the microscope device 18 that are the same as the configurations in the microscope device 12 are given the same reference numerals, and explanations thereof are omitted.

The microscope device 18 further has: a laser light source 500 for second probe light in addition to the laser light source 104 for first probe light; a third intensity-modulating unit 570 that intensity-modulates second probe light; a half-wave plate 640 that rotates the polarization direction of the second probe light; and a mirror 644 and a dichroic mirror 642 that combine the second probe light with the first probe light. The dichroic mirror 618 combines pump light with the first probe light, and second probe light. The third intensity-modulating unit 570 has a driver 572, and an AOFS 574.

As illustrated in FIG. 20, the wavelength of pump light is at an overlapping portion of the absorption spectrum C of a first fluorescent substance, and the absorption spectrum D of a second fluorescent substance, and excites both the fluorescent substances. The wavelength of the first probe light is in the fluorescence spectrum A of the first fluorescent substance, and induces stimulated emission of the first fluorescent substance. The wavelength of the second probe light is in the fluorescence spectrum B of the second fluorescent substance, and induces stimulated emission of the second fluorescent substance. By using fluorescent substances with a large Stokes shift, and using common pump light for them, it becomes possible to reduce the number of light sources, and make the device configuration simple. Note that the observed subject 184 contains the first and second fluorescent substances.

In the microscope device 18, the pump light, and the first probe light, and second probe light are intensity-modulated at different frequencies f1, f2, f3, respectively, by the two AOFSs 514, 524, and the AOMs 534, 574, respectively. IPump, IProbe1, and IProbe2 are defined as the optical intensities of the pump, the first probe, and the second probe, and then their time waveforms are:

[Formula 13]

$$I_{Pump}(t) = I_1[1 + \cos(f_1 t)] \quad (3.1)$$

$$I_{Probe1}(t) = I_2[1 + \cos(f_2 t)] \quad (3.2)$$

$$I_{Probe2}(t) = I_3[1 + \cos(f_3 t)] \quad (3.3)$$

These lights of three colors are combined by the dichroic mirror 618, passes through the scanning unit 150, and concentrated by the object lens 164 onto the observed subject 184.

The microscope device 18 has the dichroic mirror 402 between the dichroic mirror 618 and the scanning unit 150. The dichroic mirror 402 reflects light in a wavelength region including the first sensing wavelength region where fluorescence from the first fluorescent substance is sensed, and the second sensing wavelength region where fluorescence from the second fluorescent substance is sensed.

A dichroic mirror 412 is disposed further on the optical path of light reflected off the dichroic mirror 402. The dichroic mirror 412 transparently transmits therethrough light in a wavelength region including the first sensing wavelength region, and reflects light in a wavelength region including the second sensing wavelength region. Note that, in another possible configuration, the dichroic mirror 412 may reflect light in the first sensing wavelength region, and transparently transmits therethrough light in the second sensing wavelength region.

Light in wavelength regions other than the first sensing wavelength region are filtered out, by the optical filter 404, from fluorescence from the first fluorescent substance having been transparently transmitted through the dichroic mirror 412, and the remaining light passes through the lens 406, and is received by the light-receiving unit 410. A reception-light signal obtained by photoelectric conversion at the light-receiving unit 410 is sensed by lock-in sensing at the lock-in amplifier 134.

On the other hand, light in wavelength regions other than the second sensing wavelength region are filtered out, by an optical filter 414, from fluorescence from the second fluorescent substance having been reflected off the dichroic mirror 412, and the remaining light passes through a lens 416, and is sensed at a light-receiving unit 420. A reception-light signal obtained by photoelectric conversion at the light-receiving unit 420 is sensed by lock-in sensing at a lock-in amplifier 135.

ICERF1, and ICERF2 are defined as a signal received at the light-receiving unit 410, and a signal received at the light-receiving unit 420, respectively, and then:

[Formula 14]

$$I_{CERF1}(t) \propto I_{Pump}{}^a(t) I_{Probe1}(t) \quad (a \geq 3) \quad (3.4)$$

$$I_{CERF2}(t) \propto I_{Pump}{}^a(t) I_{Probe2}(t) \quad (a \geq 3) \quad (3.5)$$

Accordingly, according to the formula (3.4), a signal received at the light-receiving unit 410, and demodulated at the lock-in amplifier 134 is desirably demodulated at a demodulation frequency:

[Formula 15]

$$f_{de1} = b f_1 \pm f_2 \quad (3.6)$$

On the other hand, according to the formula (3.5), a signal received at the light-receiving unit 420, and demodulated at the lock-in amplifier 135 is desirably demodulated at a demodulation frequency:

[Formula 16]

$$f_{de2} = b f_1 \pm f_3 \quad (3.7)$$

Here, $a \geq b \geq a-1$.

As illustrated in FIG. 20, in typical multicolor observation, fluorescence produced from the fluorescent substance 1 is also sensed in the second sensing wavelength region, a drawback of crosstalk of fluorescence arises. However, a CERF signal of the fluorescent substance 1 mixed in the sensing region 2 is produced to have the frequency fde1; on the other hand, a CERF signal of the fluorescent substance 2 that is desired to be acquired in the sensing region 2 is produced to have the frequency fde2. Accordingly, by using fde2 as the demodulation frequency for the second sensing wavelength region, crosstalk of fluorescence can be suppressed. Since, in this manner, crosstalk of fluorescence signals can be suppressed by setting the modulation frequencies for two probe lights at different values, simultaneous observation of two colors also becomes possible.

Figure 21:
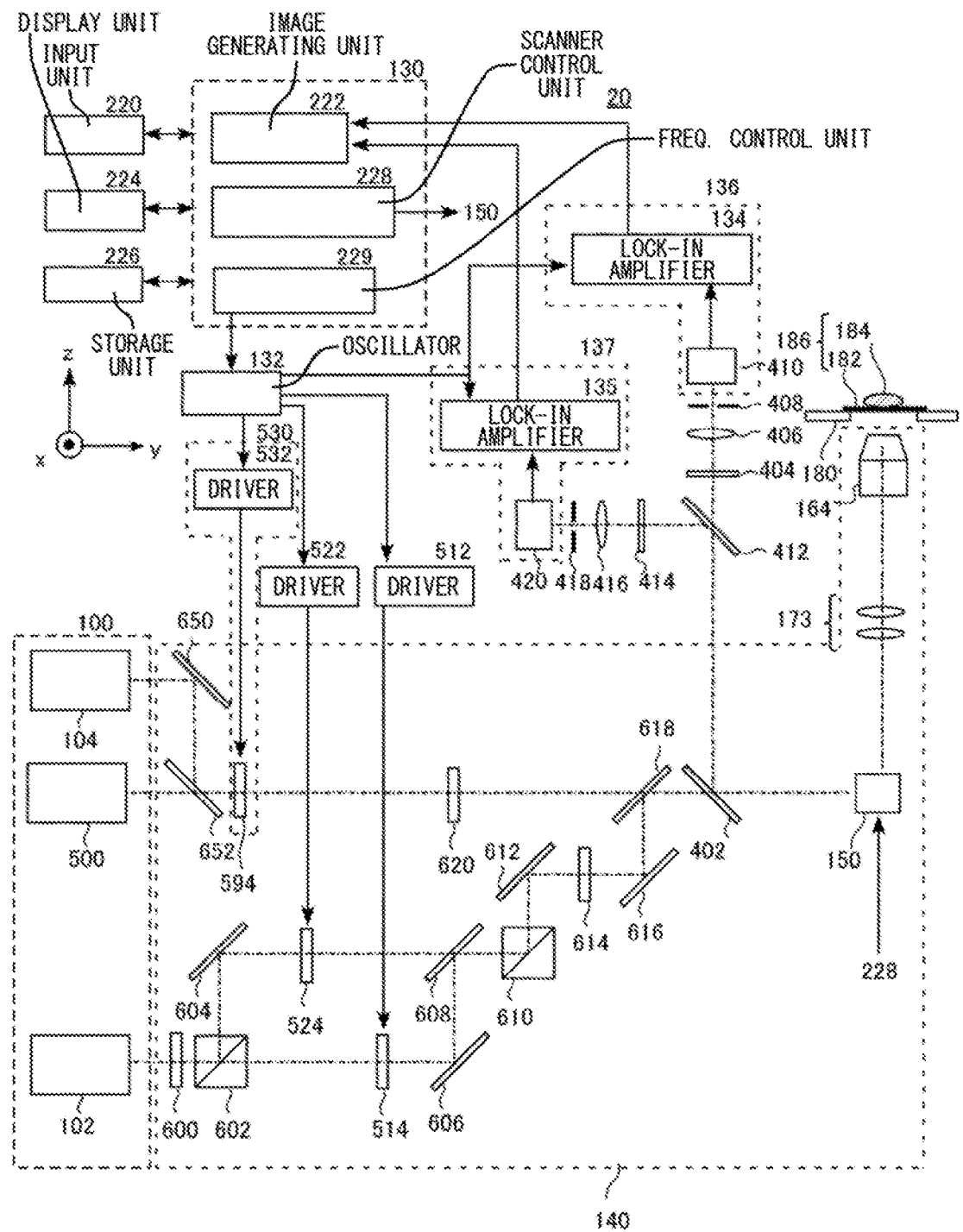
FIG. 21 is a figure illustrating the configuration of still another microscope device 20.

FIG. 21 is a figure illustrating the configuration of still another microscope device 20. Although the microscope device 18 has the AOMs 534, 574 that are placed on the optical paths of probe lights for intensity-modulation of those lights, in another possible configuration, the microscope device 20 may have a single acousto-optic tunable filter 594 (also referred to as an AOTF) that modulates both the first probe light, and second probe lights. In this case, the AOTF 594 intensity-modulates the first probe, and the second probe at f2, and f3, respectively. Since the AOTF 594 is capable of intensity-modulation at different frequencies for different wavelengths, multicolor observation can be realized with a simpler device configuration.

Figure 22:
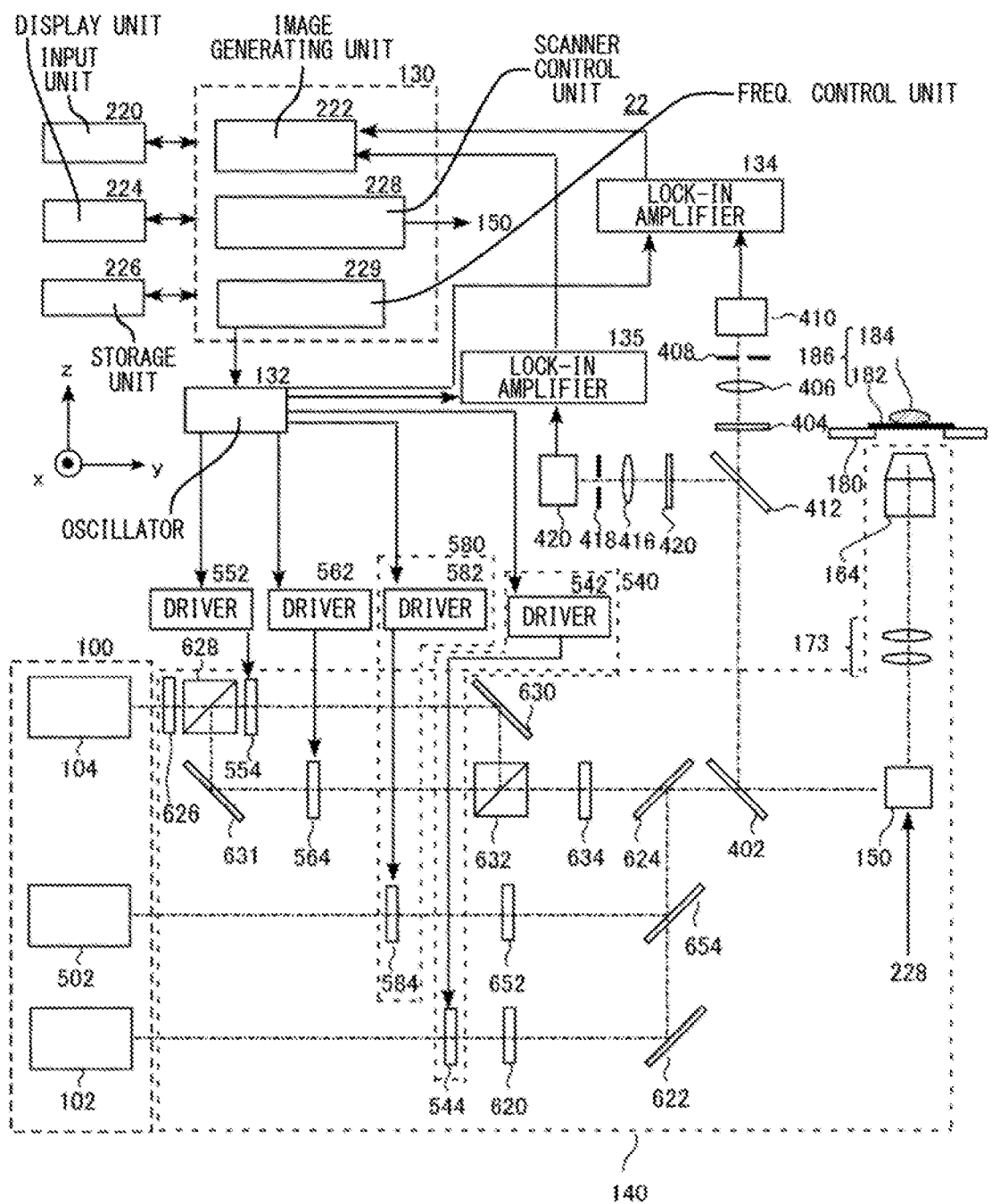
FIG. 22 is a figure illustrating the configuration of still another microscope device 22.
Figure 23:
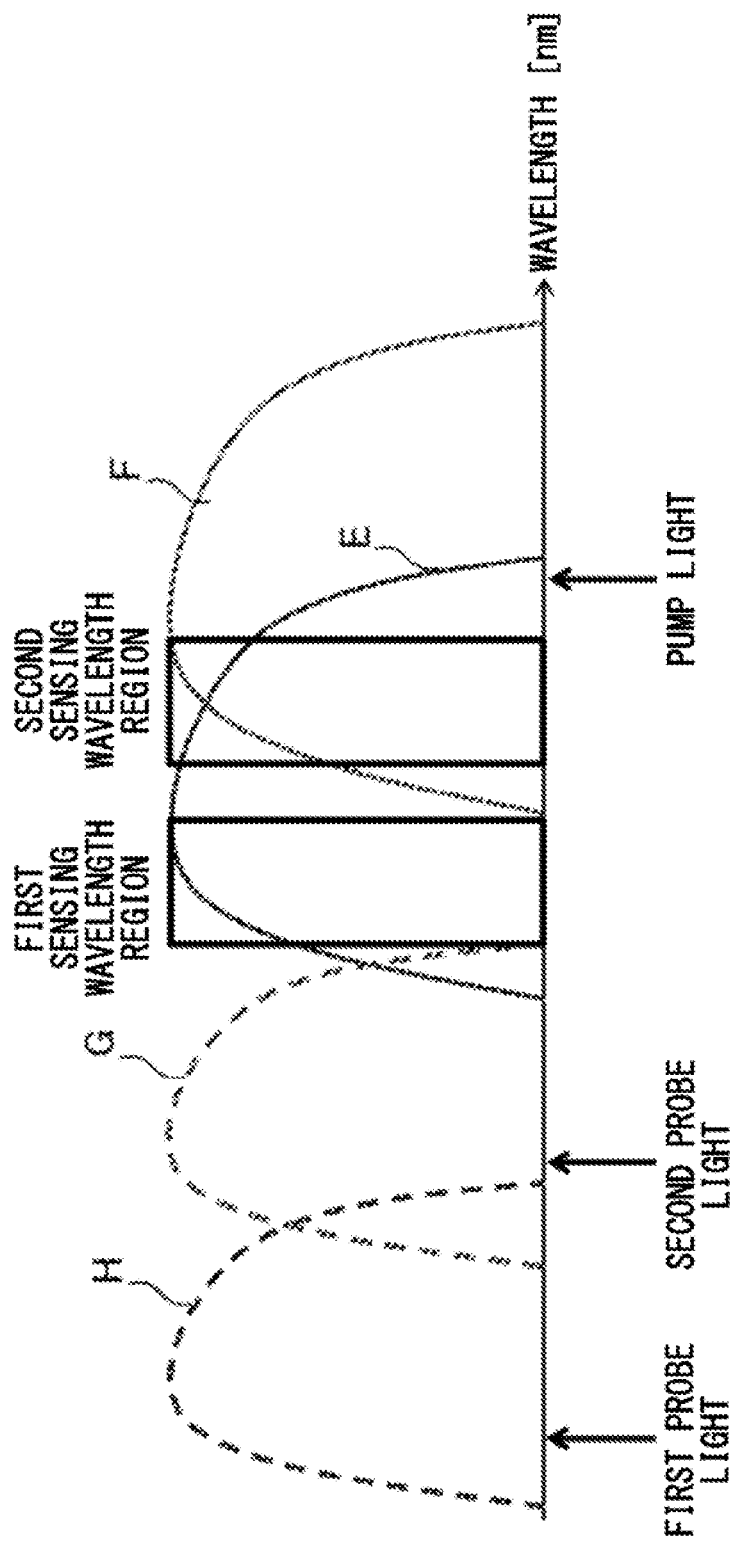
FIG. 23 illustrates a relationship among the excitation/fluorescence spectrum of each fluorescent substance, and the wavelengths of pump light, probe light, and sensing wavelength regions.

FIG. 22 is a figure illustrating the configuration of still another microscope device 22, and FIG. 23 illustrates a relationship among the excitation/fluorescence spectrum of each fluorescent substance, the light source wavelengths, and the wavelengths of sensed fluorescence. Similar to the microscope device 18, the microscope device 22 is used for reduced fluorescence observation based on multicolor fluorescence. Particularly, the microscope device 22 is used when there are two types of fluorescent substances, and a common probe light is used, and different pump lights are used. Configurations of the microscope device 22 that are the same as the configurations in the microscope devices 10 to 20 are given the same reference numerals, and explanations thereof are omitted.

The microscope device 22 further has: a laser light source 502 for second pump light in addition to the laser light source 102 for first pump light; an intensity-modulating unit 580 that intensity-modulates second pump light; a half-wave plate 626 that rotates the polarization direction of second probe light; and a mirror 622 and a dichroic mirror 654 that combine the second pump light with the first pump light. The dichroic mirror 624 combines the first pump light, and second pump light with probe light. The intensity-modulating unit 580 has a driver 582, and an AOM 584.

As illustrated in FIG. 23, the wavelength of the first pump light is in the absorption spectrum H of the first fluorescent substance, and excites the first fluorescent substance. The wavelength of the second pump light is in the absorption spectrum G of the second fluorescent substance, and excites the second fluorescent substance. The wavelength of the probe light is in the overlapping portion of the fluorescence spectrum E of the first fluorescent substance and the fluorescence spectrum F of the second fluorescent substance, and induces stimulated emission of both the fluorescent substances. By using fluorescent substances with a large Stokes shift, and using common probe light for them, it becomes possible to reduce the number of light sources, and make the device configuration simple. Note that the observed subject 184 contains the first and second fluorescent substances.

In the microscope device 22, the first pump light, and second pump light, and the probe light are intensity-modulated at different frequencies f1, f2, f3, respectively, by the AOMs 544, 584, and the two AOFSs 554, 564, respectively. IPump1, IPump2, and IProbe are defined as the optical intensities of the first pump, second probe, and probe, and then their time waveforms are:

[Formula 17]

$$I_{Pump1}(t)=I_1[1+\cos(f_1 t)] \quad (3.8)$$

$$I_{Pump2}(t)=I_2[1+\cos(f_2 t)] \quad (3.9)$$

$$I_{Probe}(t)=I_3[1+\cos(f_3 t)] \quad (3.10)$$

These lights of three colors are combined by the dichroic mirror 624, passes through the scanning unit 150, and concentrated by the object lens 164 onto the observed subject 184.

The microscope device 22 has the dichroic mirror 402 between the dichroic mirror 624 and the scanning unit 150. The dichroic mirror 402 reflects light in a wavelength region including the first sensing wavelength region where fluorescence from the first fluorescent substance is sensed, and the second sensing wavelength region where fluorescence from the second fluorescent substance is sensed.

The dichroic mirror 412 is disposed further on the optical path of light reflected off the dichroic mirror 402. The dichroic mirror 412 transparently transmits therethrough light in a wavelength region including the first sensing wavelength region, and reflects light in a wavelength region including the second sensing wavelength region. Note that, in another possible configuration, the dichroic mirror 412 may reflect light in the first sensing wavelength region, and transparently transmits therethrough light in the second sensing wavelength region.

Light in wavelength regions other than the first sensing wavelength region are filtered out, by the optical filter 404, from fluorescence from the first fluorescent substance having been transparently transmitted through the dichroic mirror 412, and the remaining light passes through the lens 406, and is received by the light-receiving unit 410. A reception-light signal obtained by photoelectric conversion at the light-receiving unit 410 is sensed by lock-in sensing at the lock-in amplifier 134.

On the other hand, light in wavelength regions other than the second sensing wavelength region are filtered out, by the optical filter 414, from fluorescence from the second fluorescent substance having been reflected off the dichroic mirror 412, and the remaining light passes through the lens 416, and is sensed at the light-receiving unit 420. A reception-light signal obtained by photoelectric conversion at the light-receiving unit 420 is sensed by lock-in sensing at a lock-in amplifier 135.

ICSRF1, and ICSRF2 are defined as a signal received at the light-receiving unit 410, and a signal received at the light-receiving unit 420, respectively, and then:

[Formula 18]

$$I_{CSRF1}(t) \propto I_{Pump1}(t) I_{Probe}^a(t) \ (a \geq 3) \quad (3.11)$$

$$I_{CSRF2}(t) \propto I_{Pump2}(t) I_{Probe}^a(t) \ (a \geq 3) \quad (3.12)$$

Accordingly, according to the formula (3.11), a signal received at the light-receiving unit 410, and demodulated at the lock-in amplifier 134 is desirably demodulated at a demodulation frequency:

[Formula 19]

$$f'_{de1} = f_1 \pm bf_3 \quad (3.13)$$

On the other hand, according to the formula (3.12), a signal received at the light-receiving unit 420, and demodulated at the lock-in amplifier 135 is desirably demodulated at a demodulation frequency:

[Formula 20]

$$f'_{de2} = f_2 \pm bf_3 \quad (3.14)$$

Here, $a \geq b \geq a-1$.

As illustrated in FIG. 23, in typical multicolor observation, fluorescence produced from the fluorescent substance 1 is also sensed in the second sensing wavelength region, a drawback of crosstalk of fluorescence arises. However, a CERF signal of the fluorescent substance 1 mixed in the second sensing wavelength region is produced to have f'de1; on the other hand, a CERF signal of the fluorescent substance 2 that is desired to be acquired in the second sensing wavelength region is produced to have f'de2. Accordingly, by using f'de2 as the demodulation frequency for the second sensing wavelength region, crosstalk of fluorescence can be suppressed. Since, in this manner, crosstalk of fluorescence signals can be suppressed by setting the modulation frequencies for two probe lights at different values, simultaneous observation of two colors also becomes possible.

Figure 24:
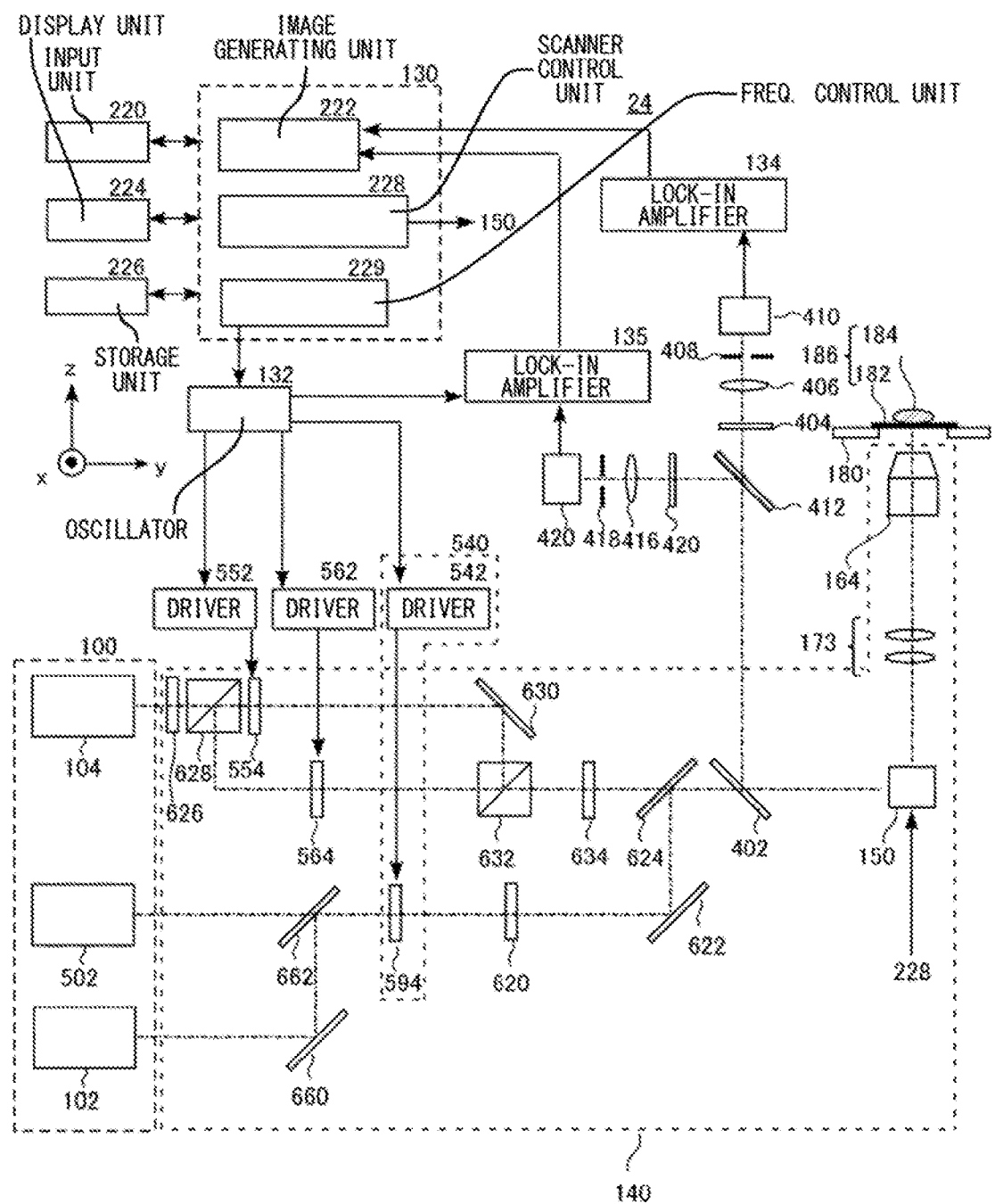
FIG. 24 is a figure illustrating the configuration of still another microscope device 24.

FIG. 24 is a figure illustrating the configuration of still another microscope device 24. Although the microscope device 22 has the AOMs 544, 584 that are placed on the optical paths of pump lights for intensity-modulation of those lights, in another possible configuration, the microscope device 20 may have the single AOTF 594 that modulates both the first pump light, and second pump light. In this case, the AOTF 594 intensity-modulates the first pump light, and the second pump light at f1, and f2, respectively. Since the AOTF 594 is capable of intensity-modulation at different frequencies for different wavelengths, multicolor observation can be realized with a simpler device configuration.

Note that at the time of two-color observation, four light sources for first pump light, and first probe light for the first fluorescent substance, and second pump light, and second probe light for the second fluorescent substance may be prepared. For CERF, desirably, intensity-modulation is performed by optical interference using two AOFSs for first pump light, and second pump light, respectively, and intensity-modulation is performed using an AOM for first probe light, and second probe light. For CSRF, desirably, intensity-modulation is performed by optical interference using an AOM for first pump light, and second pump light, and intensity-modulation is performed using two AOFSs for first probe light, and second probe light, respectively.

Figure 25:
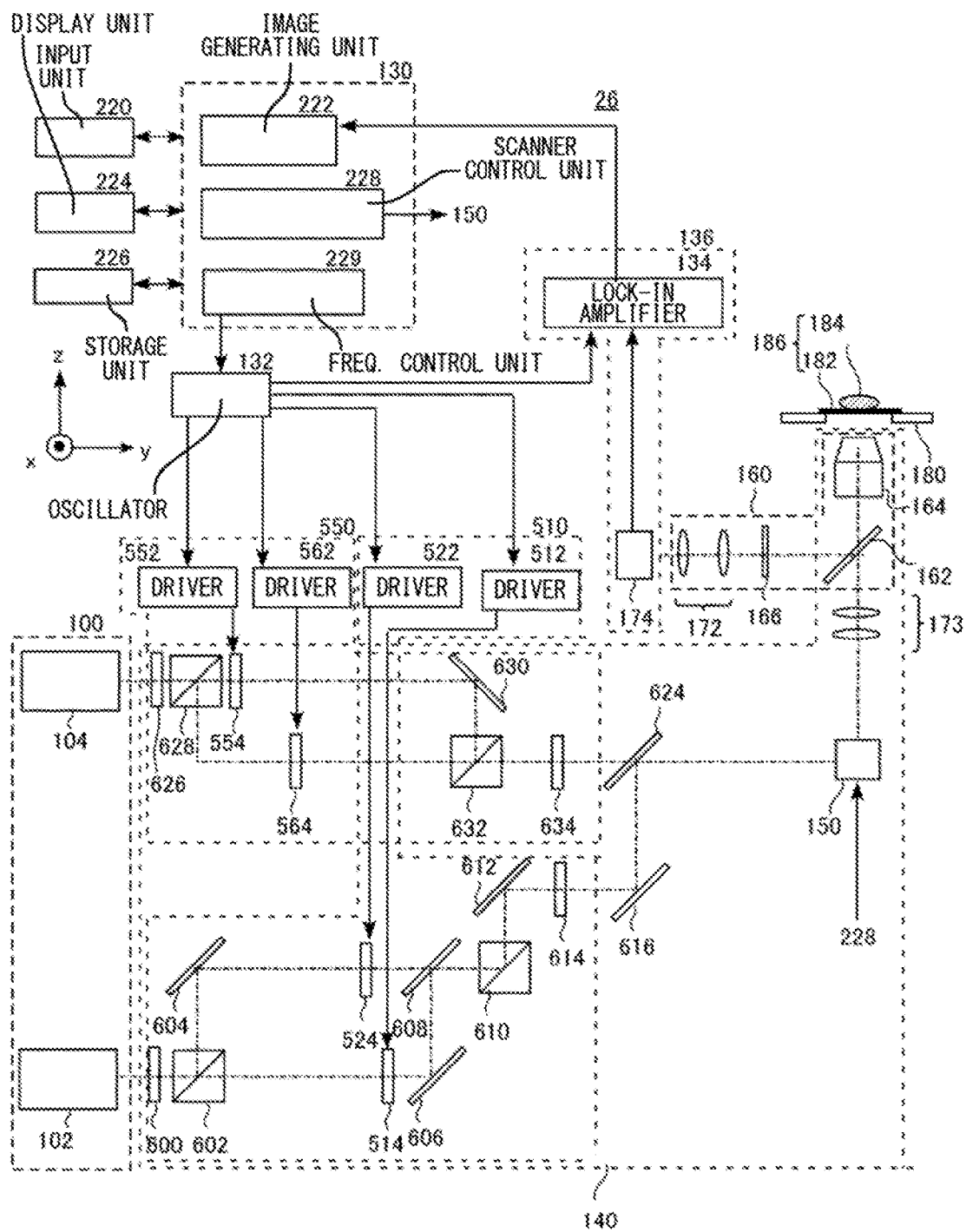
FIG. 25 is a figure illustrating the configuration of still another microscope device 26.
Figure 26:
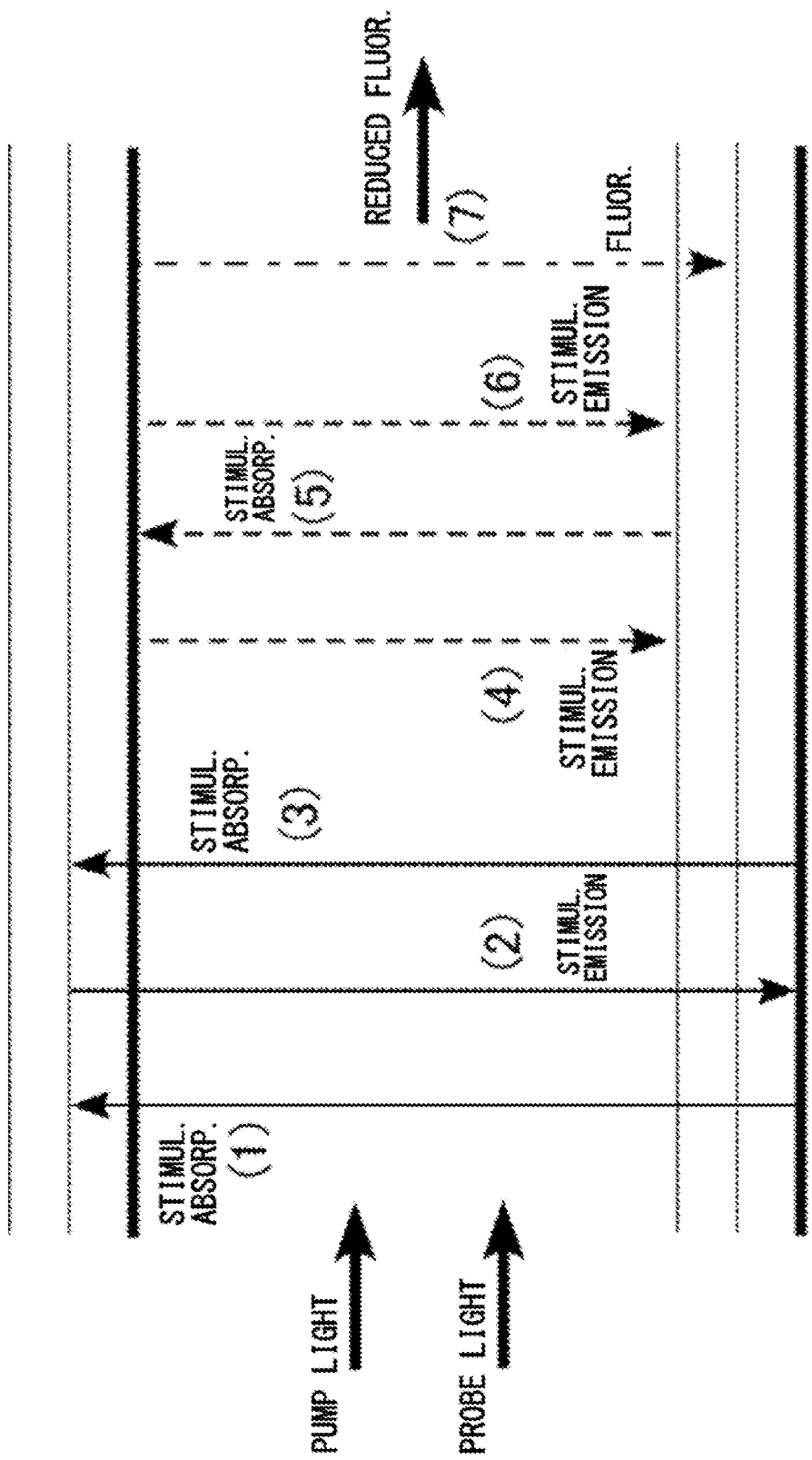
FIG. 26 is a state transition diagram.
Figure 27:
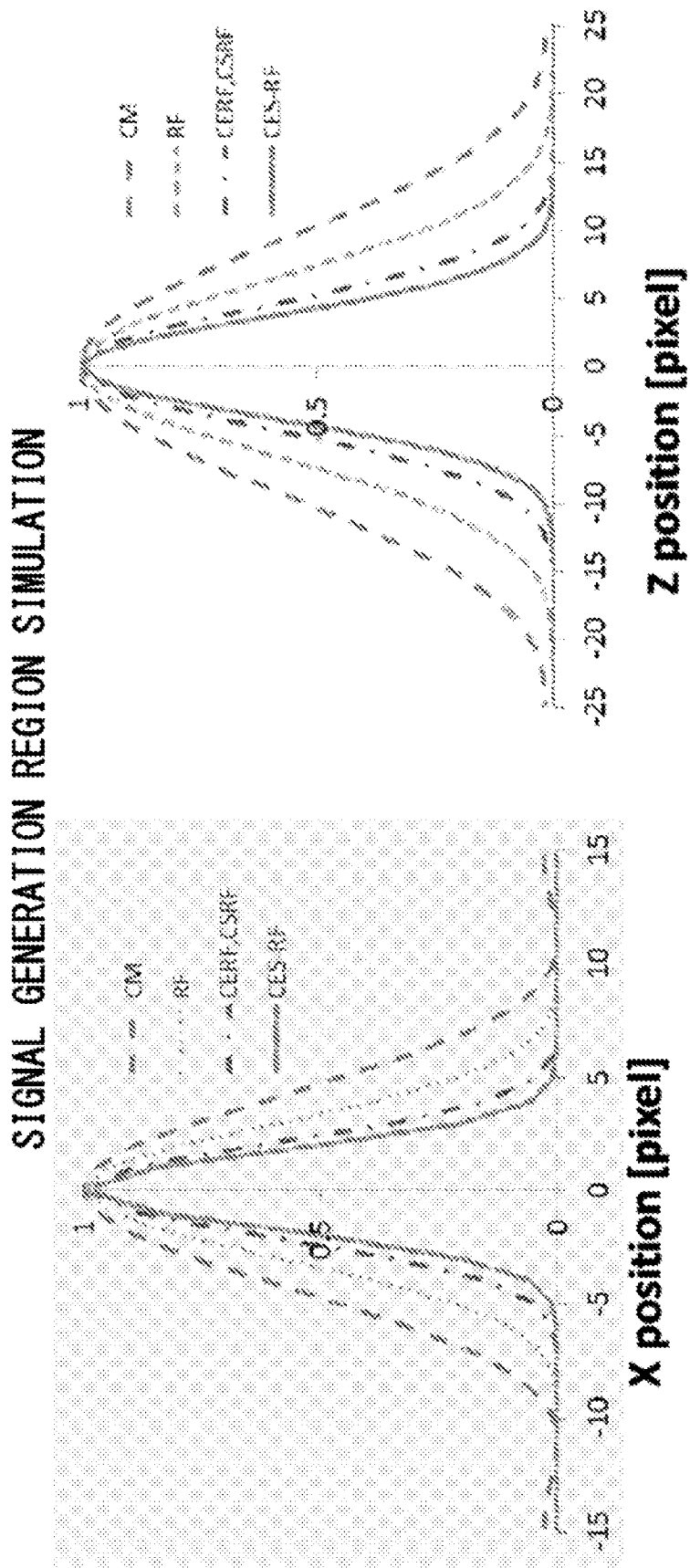
FIG. 27 illustrates a signal generation region simulation result.

FIG. 25 is a figure illustrating the configuration of still another microscope device 26. FIG. 26 is a state transition diagram, and FIG. 27 illustrates a signal generation region simulation result. The microscope device 26 is used for a technique to enhance spatial resolution (CES-RF, Cyclic Excitation and Stimulated emission Reduced Fluorescence) utilizing effects of both stimulated absorption/stimulated emission induced by pump light many times, and stimulated absorption/stimulated emission induced by probe light many times by acquiring reduced fluorescence signals generated if they are induced simultaneously. Configurations of the microscope device 26 that are the same as those of the microscope devices 10 to 24 are given the same reference numerals, and explanations thereof are omitted.

The microscope device 26 uses the two AOFSs 514, 524 for intensity-modulation of pump light similar to the microscope device 10, and a difference f1 is provided between two acoustic wave frequencies. The microscope device 26 uses the two AOFSs 554, 564 for modulation of the probe light intensity similar to the microscope device 14, and a difference f2 is provided between two acoustic wave frequencies.

The pump light, and probe light intensity-modulated at f1, and f2, respectively, are combined by the dichroic mirror 624, and guided to the scanning unit 150. The light used for scanning by the scanning unit 150 is concentrated onto the observed subject 184 by the object lens 164. The optical system that senses fluorescence signals produced from the observed subject 184 is the same as that of the microscope device 10, and so explanations thereof are omitted.

FIG. 26 illustrates principles of the proposed technique. The pump light, and probe light are intensity-modulated at the frequencies f1, f2 for a length of time, and their time waveforms IPump, and IProbe are represented by the formulae (1.1), (1.2).

At this time, in an interaction between the light and the substance, the following processes:

(step 1) Stimulated absorption induced by pump light (1);

(step 2) Stimulated emission induced by pump light (2);

(step 3) Stimulated absorption induced by pump light (3);

(step 4) Stimulated emission induced by probe light (4);

(step 5) stimulated absorption induced by probe light (5); and (step 6) stimulated emission induced by probe light (6)

occur in a time sequence at a certain probability. Reduced fluorescence signals produced as a result of this are defined as CES-RF signals (7), and then:

[Formula 21]

$$I_{CESRF}(t) \propto I_{Pump}{}^3 I_{Probe}{}^3 = I_1{}^3 I_2{}^3 [1+\cos f_1 t]^3 [1+\cos f_2 t]^3 \quad (5.1)$$

In the fluorescent sample, such an interaction between the light and the substance is constantly repeated. The frequency components included in the formula (5.1) are illustrated in Table 1.

TABLE 1

Spatial Frequency Components in Formula (5.1)

| | f2: 0 | f2: 1 | f2: 2 | f2: 3 |
|---|---|---|---|---|
| f1: 0 | | $f_2$ | $2f_2$ | $3f_2$ |
| f1: 1 | $f_1$ | $f_1 \pm f_2$ | $f_1 \pm 2f_2$ | $f_1 \pm 3f_2$ |
| f1: 2 | $2f_1$ | $2f_1 \pm f_2$ | $2f_1 \pm 2f_2$ | $2f_1 \pm 3f_2$ |
| f1: 3 | $3f_1$ | $3f_1 \pm f_2$ | $3f_1 \pm 2f_2$ | $3f_1 \pm 3f_2$ |

Accordingly, by performing demodulation at any one of 2f1±2f2, 3f1±3f2, 3f1±2f2, and 2f1±3f2, CES-RF signals can be sensed. An advantage of sensing these signals is that, since the sensing signals are obtained as a result of multiple products of pump light, and probe light, the signal generation region is restricted. In addition, since the signals are proportional to each of the third power of I1, and the third power of I2, the signal quantity is significantly increased by raising the pump light intensity I1 or raising the probe light intensity I2, and the signal-to-noise ratio can also be enhanced.

FIG. 27 illustrates a signal generation region simulation result. For comparison, signal generation regions of a typical confocal microscope (CM), a reduced fluorescence (RF) microscope, CERF, and CSRF are illustrated. It can be known that, due to the effect attained by producing signals in the distribution as represented by the multiple products of pump light and probe light, the signal generation region of CES-RF becomes sharp in both the X direction, and Z direction.

Note that the illustrated order of Steps 1 to 6 is an example, the order of stimulated absorption/stimulated emission induced by pump light, and stimulated absorption/emission induced by probe light can be reversed, and there are various combinations. In addition, signals with a larger number of times of repetition may be sensed, and in such a case, further resolution enhancement is expected. This can be generalized and represented as a formula of demodulation frequencies, i×f1±j×f2 (i and j are positive integers, and any one of them is equal to or larger than two).

Note that instead of the scanning unit 150, the scanning unit 151 illustrated in FIG. 6, or the scanning unit 156 illustrated in FIG. 7 may be used in the microscope devices 12 to 26.

The laser light sources 102, and the like used are continuous wave laser light sources, but may be pulsed laser light sources. A pulsed laser provides an advantage of efficiently inducing stimulated emission, and producing reduced fluorescence signals efficiently since its peak intensity is high. In addition, it also provides an advantage of being able to acquire reduced fluorescence signals reflecting fluorescence lifetime by utilizing temporal differences between pulses. Note that the repetition frequency of pulses is desirably determined taking fluorescence lifetime or damages caused by peak power into consideration. On the other hand, CW lasers provide an advantage in terms of lower prices. In addition, the light-receiving unit 174, and the like used are photomultipliers, but may be avalanche photodiodes (APDs).

In addition, although one-photon excitation is used for excitation in the above-mentioned embodiments, multiphoton excitation such as two-photon excitation or three-photon excitation may be used.

In the above-mentioned embodiments, in a configuration of sensing fluorescence by descanning at the time of reduced fluorescence observation, the pinhole 408 or the like may be narrowed. As a result, the point spread function of an imaging system also contributes to optical resolution enhancement, and so further resolution enhancement becomes possible. When a bright fluorescent substance that gives a sufficient amount of light is observed, it is desirable to adopt a configuration in which the pinhole 408 or the like is narrowed. On the other hand, when a dark fluorescent substance that does not give a sufficient amount of light is observed, it is desirable to adopt a configuration in which the pinhole 408 or the like is opened.

In addition, if there is a drawback of spot shift in the in-plane direction of pump light and probe light due to chromatic aberration of magnification at the time of wide field-of-view observation, or if there is a drawback of spot shift in the optical-axis direction of pump light and probe light due to axial chromatic aberration in observation of deep portions, it is desirable to make the beam diameter of pump light thinner than the beam diameter of probe light. Thereby, the spot of pump light widens in the in-plane direction/optical-axis direction, and it becomes easier to make beams overlapped. Note that a reason for making the beam diameter of pump light thin is because the spot diameter of pump light is smaller than that of probe light when spots with the same beam diameter are generated in the same object lens since pump light has a shorter wavelength than that of probe light.

A descan optical system may be used in the microscope device 26, as in the microscope device 12. On the other hand, descan optical systems may not be used in the microscope devices 18 to 24. If a confocal observation image is acquired using a descan optical system in multicolor observation, first pump light, and second pump light (or first probe light, and second probe light) may be modulated at the frequencies f1, f2, and sensed by lock-in sensing. Thereby, the influence of crosstalk of fluorescence can be suppressed.

Although in any of the above-mentioned embodiments, stimulated emission induced by pump light or stimulated emission induced by probe light is utilized for a transition process from the excited state to the ground state, the present invention is not limited to it, and may utilize contribution of other transition processes. For example, contribution of spontaneous emission (fluorescence) may also be utilized. Alternatively, a phenomenon in which fluorescence becomes not proportional linearly to pump light (saturation of fluorescence) may be utilized to acquire high-resolution reduced fluorescence signals. In this case, demodulation is desirably performed at the frequency of $i \times f1 \pm f2$ (i is an integer which is equal to or larger than two). Also in this case, in another possible configuration, since it is possible to acquire fluorescence signals produced by non-linear fluorescence/repetitive excitation by demodulation at $i \times f1$ (i is an integer which is equal to or larger than two), the signals may be acquired. Alternatively, a phenomenon in which stimulated emission light becomes not proportional linearly to probe light (saturation of stimulated emission) may be utilized to acquire high-resolution reduced fluorescence signals. In this case, demodulation is desirably performed at the frequency of $f1 \pm j \times f2$ (j is an integer which is equal to or larger than two). If they happen simultaneously, demodulation is desirably performed at $i \times f1 \pm j \times f2$ (i and j are integers which are equal to or larger than two).

In any of the above-mentioned embodiments, instead of AOMs, an EOM (electro-optical element) and a polarizer may be used, and polarization directions may be switched at high speed to thereby realize optical intensity modulation. Alternatively, a mechanical shutter such as a chopper may be used.

In another possible configuration, a phase plate (radial polarizer) may be inserted in any of the optical paths of light in the microscope devices 10 to 26. Thereby, the point spread function of light transparently transmitted through the phase plate becomes sharper in the in-plane direction, and the resolution enhancement effect is increased. Generally, in return for a sharper distribution in the in-plane direction, a use of such a phase plate gives rise to drawbacks such as that (i) side lobes are produced, and (ii) the distribution in the optical-axis direction widens. However, since, in the proposed technique, the signal generation region is an overlapping region of multiple types of light, these drawbacks are overcome, and only a benefit of a sharper in-plane direction distribution can be enjoyed. Note that different phase plates may be inserted for different types of light, or a single phase plate may be inserted in a common optical path of the two types of light. Note that a phase plate with another shape may be used. In addition, a mask may be inserted instead of a phase plate, and the shape of the point spread function may be controlled by making the amplitude of light have a distribution. For example, even if a zone plate is inserted, and a Bessel beam is generated, similar effects can be attained.

Note that if modulation distortion caused by AOMs can be neglected, both pump light and probe light may be modulated by independent AOMs. Alternatively, a single acousto-optic tunable filter (AOTF) may be used to modulate pump light and probe light. An AOTF allows modulation of optical intensities at different modulation frequencies for different wavelengths. If at the time of multicolor observation, there are a plurality of pump lights and probe lights, a single AOTF may be used to modulate the individual lights at different frequencies.

Note that since a point spread function is proportional to a wavelength, pump light gives a smaller point spread function than probe light does. This is because pump light has a shorter wavelength. Accordingly, if, at the time of CES-RF observation, degrees of repetition are equal, CERF that utilizes the effect of repetition by pump light provides higher resolution than CSRF that utilizes repetition by probe light does. Thereby, the configuration in which the relationship of $i > j$ holds true for frequencies of demodulation is more desirable in terms of enhancement of resolution. On the other hand, if damages caused by increases in power of pump light become drawbacks, the configuration in which the relationship $i < j$ holds true is desirable.

In addition, similar to the microscope device 12, the microscope devices 10, 14, 16, 18, 20, 22, 24, 26 may also be provided with the wavelength control unit 230 to control the wavelengths of light from the laser light sources. In addition, although a microscope device is used in any of the above-mentioned embodiments, the embodiments may be applied not only to a microscope, but to any fluorescence observation device capable of observing reduced fluorescence.

In addition, although the dichroic mirrors 162, 402 transparently transmit therethrough illuminating light, and reflect fluorescence, instead, they may reflect illuminating light, and transparently transmit therethrough fluorescence.

Note that although lock-in amplifiers are explained as means for sensing signal components of particular frequencies, other methods may be utilized. For example, signal components of particular frequencies may be sensed after Fourier transform of time signals. For example, in another possible configuration, reference signals with the demodulation frequency may be multiplied with signal light by a frequency converter, and only DC components may be extracted. Note that "DC components" mentioned here are equivalent to values obtained by converting components vibrating in a sine wave form into direct current.

In addition, in any of the microscope devices, the voltage input to a driver that drives an AOFS may be a DC power source. In another possible configuration, only one of two AOFSs may have a variable acoustic frequency. Alternatively, the acoustic frequencies of two AOFSs may be fixed at different values in advance.

Note that to which power of pump light and probe light a signal produced at a particular demodulation frequency is proportional depends on a dominant process that is producing the signal. For example, if demodulation is performed at the frequency of 2f1±f2, it may be proportional to the second power of pump light, or may be proportional to the third power of pump light. It may be proportional to the first power of probe light, or may be proportional to the second power of probe light. In addition, for example, if demodulation is performed at the frequency at f1±2f2, it may be proportional to the first power of pump light, or may be proportional to the second power of pump light. It may be proportional to the second power of probe light, or may be proportional to the third power of probe light.

Note that in any of the microscope devices, pump light, and probe light desirably have the same polarization. For example, they desirably have the same linear polarization or circular polarization. Alternatively, in another possible configuration, images based on reduced fluorescence may be acquired in the case where pump light and probe light have mutually orthogonal linear polarization, and in the case where pump light and probe light have mutually parallel linear polarization, and the images may be compared to thereby visualize the polarization characteristics of an observed subject. This is because the efficiency of stimulated emission depends on polarization.

What is claimed is:

1. A fluorescence observation device comprising:
    a first intensity-modulating unit that receives a pump light and intensity-modulates, at a frequency f1, the received pump light, to thereby provide an intensity-modulated pump light that excites fluorescence of an observed subject;
    a second intensity-modulating unit that receives a probe light and intensity-modulates, at a frequency f2 different from the frequency f1, the received probe light, to thereby provide an intensity-modulated probe light that induces stimulated emission of the observed subject; and
    a sensing unit that receives the fluorescence from the observed subject irradiated with the intensity-modulated pump light and the intensity-modulated probe light and thereby produces a reception-light signal, and senses a component with a frequency of i×f1±j×f2 (i and j are positive integers, at least one of which is equal to or larger than two) in the reception-light signal.

2. The fluorescence observation device according to claim 1, further comprising:
    a scanning unit that two-dimensionally scans the observed subject with the intensity-modulated pump light, and the intensity-modulated probe light.

3. The fluorescence observation device according to claim 2, wherein the scanning unit has a resonant mirror for scanning in a main scanning direction, and a galvano mirror for scanning in a sub-scanning direction.

4. The fluorescence observation device according to claim 3, wherein the sensing unit receives the fluorescence having passed through the scanning unit in a direction opposite to a direction of the intensity modulated pump light, and the intensity modulated probe light.

5. The fluorescence observation device according to claim 4, further comprising:
    a pinhole disposed immediately before the sensing unit, wherein
    the sensing unit receives the fluorescence having passed through the pinhole.

6. The fluorescence observation device according to claim 1, wherein
    the first intensity-modulating unit has:
        a polarization beam splitter that splits the received pump light into two orthogonally polarized lights;
        a first acousto-optic frequency shifter that shifts a light frequency of one of the polarized lights by an acoustic wave frequency g1;
        a second acousto-optic frequency shifter that shifts a light frequency of the other of the polarized lights by an acoustic wave frequency (g1+f1);
        a polarization beam combiner that combines the two frequency-shifted polarized lights; and
        a polarizer that transparently transmits therethrough a polarized light which is in the combined pump light and polarized in a direction different from polarization directions of the two orthogonally polarized lights, the polarized light exiting from the polarizer as the intensity-modulated pump light intensity-modulated at the frequency f1, and
    i is equal to or larger than two.

7. The fluorescence observation device according to claim 1, wherein
    the second intensity-modulating unit has:
        a polarization beam splitter that splits the received probe light into two orthogonally polarized lights;
        a first acousto-optic frequency shifter that shifts a light frequency of one of the polarized lights by an acoustic wave frequency g2;
        a second acousto-optic frequency shifter that shifts a light frequency of the other of the polarized lights by an acoustic wave frequency (g2+f2);
        a polarization beam combiner that combines the two frequency-shifted polarized lights; and
        a polarizer that transparently transmits therethrough a polarized light which is in the combined probe light and polarized in a direction different from polarization directions of the two orthogonally polarized lights, the polarized light exiting from the polarizer as the intensity-modulated probe light intensity-modulated at the frequency f2, and
    j is equal to or larger than two.

8. A fluorescence observation device comprising:
    a first intensity-modulating unit that receives a pump light and intensity-modulates, at a frequency f1, the received pump light, to thereby provide an intensity modulated pump light that excites fluorescence of an observed subject;
    a second intensity-modulating unit that receives a first probe light and intensity-modulates, at a frequency f2 different from the frequency f1, the first probe light, to thereby provide an intensity-modulated first probe light that induces stimulated emission of the observed subject;
    a third intensity-modulating unit that receives a second probe light and intensity-modulates, at a frequency f3 different from the frequencies f1 and f2, the received second probe light, to thereby provide an intensity modulated second probe light that induces stimulated emission of the observed subject, and has a wavelength different from the intensity-modulated first probe light;

a first sensing unit that receives fluorescence from the observed subject irradiated with the intensity-modulated pump light, the intensity-modulated first probe light, and the intensity-modulated second probe light, and thereby produces a first reception-light signal, and senses a component with a frequency of $i \times f1 \pm j \times f2$ (i and j are positive integers, at least one of which is equal to or larger than two) in the first reception-light signal, wherein the fluorescence received by the first sensing unit corresponds to the intensity-modulated pump light and the intensity-modulated first probe light;

a second sensing unit that receives fluorescence from the observed subject irradiated with the intensity-modulated pump light, the intensity-modulated first probe light, and the intensity-modulated second probe light, and thereby produces a second reception-light signal, and senses a component with a frequency of $p \times f1 \pm q \times f3$ (p and q are positive integers, at least one of which is equal to or larger than two) in the second reception-light signal, wherein the fluorescence received by the second sensing unit corresponds to the intensity-modulated pump light and the intensity-modulated second probe light.

9. The fluorescence observation device according to claim 8, wherein
the first intensity-modulating unit has:
a polarization beam splitter that splits the received pump light into two orthogonally polarized lights;
a first acousto-optic frequency shifter that shifts a light frequency of one of the polarized lights by an acoustic wave frequency g1;
a second acousto-optic frequency shifter that shifts a light frequency of the other of the polarized lights by an acoustic wave frequency (g1+f1);
a polarization beam combiner that combines the two frequency-shifted polarized lights; and
a polarizer that transparently transmits therethrough a polarized light which is in the combined pump light and polarized in a direction different from polarization directions of the two orthogonally polarized lights, the polarized light exiting from the polarizer as the intensity-modulated pump light intensity-modulated at the frequency f1, and
i and p are equal to or larger than two.

10. A fluorescence observation device comprising:
a first intensity-modulating unit that receives a first pump light and intensity-modulates, at a frequency f1, the received first pump light, to thereby provide an intensity-modulated first pump light that excites fluorescence of an observed subject;
a second intensity-modulating unit that receives a second pump light and intensity-modulates, at a frequency f2 different from the frequency f1, the received second pump light to thereby provide an intensity-modulated second pump light that excites the fluorescence of the observed subject, and has a wavelength different from the intensity modulated first pump light;
a third intensity-modulating unit that receives a probe light and intensity-modulates, at a frequency f3 different from the frequencies f1 and f2, the received probe light, to thereby provide an intensity-modulated probe light that induces stimulated emission of the observed subject;
a first sensing unit that receives fluorescence from the observed subject irradiated with the intensity-modulated first pump light, the intensity-modulated second pump light, and the intensity-modulated probe light and thereby produces a first reception-light signal, and senses a component with a frequency of $i \times f1 \pm j \times f2$ (i and j are positive integers, at least one of which is equal to or larger than two) in the first reception-light signal, wherein the fluorescence received by the first sensing unit corresponds to the intensity-modulated first pump light and the intensity-modulated probe light;

a second sensing unit that receives fluorescence from the observed subject irradiated with the intensity-modulated first pump light, the intensity-modulated second pump light, and the intensity-modulated probe light and thereby produces a second reception-light signal, and senses a component with a frequency of $p \times f2 \pm q \times f3$ (p and q are positive integers, at least one of which is equal to or larger than two) in the second reception-light signal, wherein the fluorescence received by the second sensing unit corresponds to the intensity-modulated second pump light and the intensity-modulated probe light.

11. The fluorescence observation device according to claim 10, wherein
the third intensity-modulating unit has:
a polarization beam splitter that splits the received probe light into two orthogonally polarized lights;
a first acousto-optic frequency shifter that shifts a light frequency of one of the polarized lights by an acoustic wave frequency g3;
a second acousto-optic frequency shifter that shifts a light frequency of the other of the polarized lights by an acoustic wave frequency (g3+f3);
a polarization beam combiner that combines the two frequency-shifted polarized lights; and
a polarizer that transparently transmits therethrough a polarized light which is in the combined probe light and polarized in a direction different from polarization directions of the two orthogonally polarized lights, the polarized light exiting from the polarizer as the intensity-modulated probe light intensity-modulated at the frequency f3, and
j and q are equal to or larger than two.

12. A fluorescence observation method comprising:
receiving a pump light;
intensity-modulating, at a frequency f1, the received pump light to thereby provide an intensity-modulated pump light that excites fluorescence of an observed subject;
receiving a probe light;
intensity-modulating, at a frequency f2 different from the frequency f1, the received probe light to thereby provide an intensity-modulated probe light that induces stimulated emission of the observed subject;
receiving, at a light-receiving unit, the fluorescence from the observed subject irradiated with the intensity-modulated pump light and the intensity-modulated probe light and thereby producing a reception-light signal; and
sensing a component with a frequency of $i \times f1 \pm j \times f2$ (i and j are positive integers, at least one of which is equal to or larger than two) in the reception-light signal.

13. A fluorescence observation method comprising:
receiving a pump light;
intensity-modulating, at a frequency f1, the received pump light, to thereby provide an intensity-modulated pump light that excites fluorescence of an observed subject;

receiving a first probe light;

intensity-modulating, at a frequency f2 different from the frequency f1, the received first probe light, to thereby provide an intensity-modulated first probe light that induces stimulated emission of the observed subject;

receiving a second probe light;

intensity-modulating, at a frequency f3 different from the frequencies f1 and f2, the received second probe light, to thereby provide an intensity-modulated second probe light that induces stimulated emission of the observed subject, and has a wavelength different from the intensity-modulated first probe light;

receiving, at a first light-receiving unit, fluorescence from the observed subject irradiated with the intensity-modulated pump light, the intensity-modulated first probe light, and the intensity-modulated second probe light, and thereby producing a first reception-light signal, wherein the fluorescence received by the first light-receiving unit corresponds to the intensity-modulated pump light and the intensity-modulated first probe light;

sensing a component with a frequency of $i \times f1 \pm j \times f2$ (i and j are positive integers, at least one of which is equal to or larger than two) in the first reception-light signal;

receiving, at a second light-receiving unit, fluorescence from the observed subject irradiated with the intensity-modulated pump light, the intensity-modulated first probe light, and the intensity-modulated second probe light, and thereby producing a second reception-light signal, wherein the fluorescence received by the second light-receiving unit corresponds to the intensity-modulated pump light and the intensity-modulated second probe light; and sensing a component with a frequency of $p \times f1 \pm q \times f3$ (p and q are positive integers, at least one of which is equal to or larger than two) in the second reception-light signal.

* * * * *